(12) United States Patent
Evans

(10) Patent No.: US 6,336,106 B1
(45) Date of Patent: Jan. 1, 2002

(54) SYSTEM AND METHOD FOR PARTITIONING A REAL-VALUED ATTRIBUTE EXHIBITING WINDOWED DATA CHARACTERISTICS

(75) Inventor: Robert Evans, Gallatin, TN (US)

(73) Assignee: R.R. Donnelley & Sons Company, Gallatin, TN (US)

( * ) Notice: Subject to any disclaimer, the term of this patent is extended or adjusted under 35 U.S.C. 154(b) by 0 days.

(21) Appl. No.: 09/026,267

(22) Filed: Feb. 19, 1998

Related U.S. Application Data

(63) Continuation-in-part of application No. 08/847,114, filed on May 1, 1997, now Pat. No. 6,009,421, which is a continuation-in-part of application No. 08/196,707, filed on Feb. 15, 1994, now Pat. No. 5,694,524.

(51) Int. Cl.$^7$ ................................................. G06N 7/00
(52) U.S. Cl. ........................... 706/12; 704/224; 342/64; 342/383
(58) Field of Search .......................... 706/12; 704/224; 342/64, 383

(56) References Cited

U.S. PATENT DOCUMENTS

| | | | |
|---|---|---|---|
| 3,822,838 A | 7/1974 | Butler, Jr. et al. | 242/75.44 |
| 3,950,988 A | 4/1976 | Nowisch et al. | 73/144 |
| 4,130,014 A | 12/1978 | Eddens | 73/144 |
| 4,186,309 A | 1/1980 | Gnuechtel | 250/561 |
| 4,359,178 A | 11/1982 | Hayashi et al. | 226/25 |

(List continued on next page.)

OTHER PUBLICATIONS

Yau, S.F.; Bresler, Y., Image restoration by complexity regularization via dynamic programming, Acoustics, Speech, and Signal Processing, 1992. ICASSP–92., 1992 IEEE International Conference on, vol. 3, Mar. 23–26, 1992, pp.: 305–308 vol. 3.*

Hajjar, A.; Chen, T., A new real time edge linking algorithm and its VLSI implementation, Computer Architecture for Machine Perception, 1997. CAMP 97. Proceedings. 1997 Fourth IEEE International Workshop on, Oct. 20–22, 1997, pp.: 280–284.*

Townsend, W.T.; Salisbury, J.K., Mechanical bandwidth as a guideline to high–performance manipulator design, Robotics and Automation, 1989. Proceedings., 1989 IEEE International Conference on , May 14–19, 1989 , pp.: 1390–1395 vol. 3.*

(List continued on next page.)

*Primary Examiner*—Kakali Chaki
*Assistant Examiner*—Wilbert Starks
(74) *Attorney, Agent, or Firm*—Marshall, O'Toole, Gerstein, Murray & Borun

(57) ABSTRACT

A system and method are disclosed for partitioning a real-value windowed attribute into ranges, wherein the values within each range generally correspond to a particular class of results associated with runs of a process. The system and method determines a low range having attribute values generally corresponding to a first class, a middle range having attribute values generally corresponding to a second class, and an upper range having attribute values generally corresponding to the first class. The system and method may be used in a system that produces an induction tree useful in developing an indication of a cause of a particular result of a process from values associated with at least one real-valued, windowed attribute that arises during the runs of the process.

23 Claims, 10 Drawing Sheets

U.S. PATENT DOCUMENTS

| | | | |
|---|---|---|---|
| RE31,312 E | 7/1983 | Eddens | 73/862.48 |
| 4,532,500 A | 7/1985 | Henk | 340/675 |
| 4,716,978 A | 1/1988 | Wales et al. | 177/25 |
| 4,821,037 A * | 4/1989 | Miller et al. | 342/383 |
| 4,847,795 A | 7/1989 | Baker et al. | 364/579 |
| 4,975,865 A | 12/1990 | Carrette et al. | 364/153 |
| 5,006,992 A | 4/1991 | Skeirik | 364/513 |
| 5,036,706 A | 8/1991 | Gnuechtel et al. | 73/597 |
| 5,121,467 A | 6/1992 | Skeirik | 395/11 |
| 5,131,074 A | 7/1992 | Nakamura et al. | 395/61 |
| 5,136,686 A | 8/1992 | Koza | 395/13 |
| 5,167,009 A | 11/1992 | Skeirik | 395/27 |
| 5,175,797 A | 12/1992 | Funabashi et al. | 395/22 |
| 5,188,028 A | 2/1993 | Reichel | 101/228 |
| 5,197,115 A | 3/1993 | Sueda et al. | 395/50 |
| 5,245,698 A | 9/1993 | Matsunaga | 395/61 |
| 5,267,141 A | 11/1993 | Morita et al. | 364/152 |
| 5,269,222 A | 12/1993 | Johnson et al. | 101/228 |
| 5,282,261 A | 1/1994 | Skeirik | 395/22 |
| 5,301,866 A | 4/1994 | Veh et al. | 226/11 |
| 5,325,774 A | 7/1994 | Breton et al. | 101/228 |
| 5,341,142 A * | 8/1994 | Reis et al. | 342/64 |
| 5,357,812 A | 10/1994 | Kübert et al. | 73/862 |
| 5,365,796 A | 11/1994 | Lin et al. | 73/862 |
| 5,365,844 A | 11/1994 | Miyashige | 101/228 |
| 5,378,918 A | 1/1995 | Öttl | 250/571 |
| 5,402,524 A | 3/1995 | Bauman et al. | 395/50 |
| 5,412,757 A | 5/1995 | Endo | 395/61 |
| 5,414,798 A | 5/1995 | Nigawara et al. | 395/75 |
| 5,434,955 A | 7/1995 | Kumamoto | 395/51 |
| 5,521,844 A | 5/1996 | Karis | 364/551.01 |
| 5,541,832 A | 7/1996 | Nakajima et al. | 364/148 |
| 5,594,836 A | 1/1997 | Ryu et al. | 395/62 |
| 5,694,524 A | 12/1997 | Evans | 395/77 |
| 5,926,786 A * | 7/1999 | McDonough et al. | 704/224 |

OTHER PUBLICATIONS

Lu, C.; Liu, H.; Ferrier, N.J., Multidimensional motion segmentation and identification, Computer Vision and Pattern Recognition, 2000. Proceedings. IEEE Conference on, vol.: 2, Jun. 13–15, 2000, pp.: 629–636 vol. 2.*

Bareiss et al., Supporting Start–to–Finish Development of Knowledge Bases, 4 Machine Learning, pp. 259–283 (1989).

Clark et al., The CN2 Induction Algorithm, 3 Machine Learning, pp. 261–283 (1989).

Kasunich et al., *Gravure Process and Technology*, Chs. 4, 6–9, 11–13, 15, pp. 37–64, 99–241, 259–362, 379–398 (Brett Rutherfored ed. 1991).

Draper, *Assessment and Propagation of Model Uncertainty*, (draft version), in Proceedings of the Fourth International Workshop on Artificial Intelligence and Statistics, pp. 497–509 (1993).

Edelstein, *Mining for Gold*, 6 pgs. (Apr. 21, 1997).

Simoudis, Reality Check for Data Mining, IEEE Expert, pp. 25–33 (Oct. 1996).

Buntine, *Operations on Counting Tables*, Turing Institute, pp. 1–4 (Oct. 1989).

Buntine, *Review and Questions on Learning Decision Trees*, Turing Institute, pp. 1–6 (Oct. 1989).

Chou, *Optimal Partitioning for Classification and Regression Trees*, 13 IEEE Transactions on Pattern Analysis and Machine Intelligence, pp. 340–354 (1991).

Buntine, *Learning Classification Trees*, RIACS & NASA Ames Research Center, pp. 1–25 (Nov. 1991).

Oliver, *Decision Graphs—An Extension of Decision Trees*, (Draft), Monash University, Australia, pp. 1–13 (Dec. 15, 1992).

Buntine et al., *Introduction to IND Version 2.1 and Recursive Partioning*, IND User's Manual, NASA Ames Research Center, Dec. 31, 1992 (including a one page summary of IND Version 2.0 and a two page summary of modifications to IND Versions 0.1 to 2.1).

Buntine, *Tree Classification Software*, presented at The Third National Technology Transfer Conference and Exposition, Baltimore, pp. 1–10 (Dec. 1992).

W.F. Punch III ed., *New NASA Software*, Expert New Products, p. 97 (Aug. 1993).

XpertRule® Analyser™ *Knowledge from Data*, User's Guide (Release 2), published by Attar Software (1994).

Angoss KnowledgeSEEKER, Version 3.0, User's Guide, published by Angoss Software Intl., Ltd. (1984–1994).

Buntine, *Recursive Partitioning Skeleton Code*, pp. 1–2 (1990).

Recursive Partitioning Skeleton Code, pp. 1–2 (1990).

Michalski et al., Learning by Being Told and Learning From Examples: An Experimental Comparison of the Two Methods of Knowledge Acquisition in the Context of Developing an Expert System for Soybean Disease Diagnosis, 4 International Journal of Policy Analysis and Information Systems 125–161 (1980).

Musen, Automated Support for Building and Extending Expert Models, 4 Machine Learning 347–375 (1989).

Shannon et al., *The Mathematical Theory of Communication*, pp. 1–5, 30–64 (1963).

Tan et al., Two Case Studies in Cost–Sensitive Concept Acquisition, in Proceedings of the Eight National Conference on Artificial Intelligence, 854–860 (1990).

Walsh, *Handbook of Nonparametric Statistics*, pp. 10, 50, 194–195, 290, 300 (1962).

Weiss et al., *Computer Systems that Learn*, Chs. 5–7, pp. 113–203 (1991).

Anderson, *The Adaptive Character of Thought*, pp. 1, 5–40 (1990).

Fayyad et al., *On the Handling of Continuous–Valued Attributes in Decision Tree Generation*, 8 Machine Learning, pp. 87–102 (1992).

Mantaras, A Distance–Based Attribute Selection Measure for Decision Tree Induction, 6 Machine Learning, pp. 81–92 (1991).

Padalkar et al., *Real–Time Fault Diagnostics*, IEEE Expert 75–85 (Jun. 1991).

Quinlan, Induction of Decision Trees, 1 Machine Learning, pp. 81–106 (1986).

Shavlik et al., Symbolic and Neural Learning Algorithms: An Experimental Comparison, 6 Machine Learning, pp. 111–143 (1991).

Smith et al., *Categories and Concepts*, Chs. 1, 2, 8, pp. 1–21, 162–182 (1981).

Weiss et al., An Empirical Comparison of Pattern Recognition, Neural Nets, and Machine Learning Classification Methods, Proceedings of the Eleventh International Joint Conference on Artificial Intelligence, pp. 781–787 (1989).

Fisher, Knowledge Acquisition Via Incremental Conceptual Clustering, 2 Machine Learning, pp. 139–172 (1987).

Rich, *Artificial Intelligence*, (1983).

Mingers, An Empirical Comparison of Pruning Methods for Decision Tree Induction, 4 Machine Learning, pp. 227–243 (1989).

Whitehall et al., CAO: A Machine Learning Tool for Engineering, vol. 5, No. 4, Artificial Intelligence in Engineering, pp. 189–198 (1990).

Schlimmer, *Incremental Adjustment of Representations for Learning*, Proceedings of the Fourth International Workshop on Machine Learning, pp. 79–90 (1987).

Lu et al., *A Machine Learning Approach to the Automatic Synthesis of Mechanistic Knowledge for Engineering Decision–Making*, 1 AI EDAM, pp. 109–118 (1987).

Buntine et al., Interactive Induction, 12 Machine Intelligence 121–137 (Hayes–Michie et al. eds. 1990).

Clark et al., *Using Qualitative Models to Guide Inductive Learning*, Proceedings of the Tenth International Machine Learning Conference, pp. 49–56 (1993).

Irani et al., *Applying Machine Learning to Semiconductor Manufacturing*, IEEE Expert, pp. 41–47 (1993).

Quinlan, *C4.5: Programs for Machine Learning* (1991).

Kerber, *ChiMerge: Discretization of Numeric Attributes*, Proceedings of the Tenth National Conference on Artificial Intelligence, pp. 123–127 (1992).

Porter et al., *Concept Learning and Heuristic Classification in Weak–Theory Domains*, 45 Artificial Intelligence, pp. 229–263 (1990).

Evans, *An Application of ID3 Using Real Valued Features*, (1991).

Evans et al., *Overcoming Process Delays with Decision Tree Induction*, IEEE Expert, pp. 60–66 (1994).

Brochure by Integral Solutions Limited, *ISL—Rules—A Powerful Tool for Generating Embeddable Rules* (1989).

Letter to applicant from Integral Solutions Limited, dated Apr. 27, 1992.

Letter to applicant from Infolink Decision Services Limited, dated Jan. 27, 1994.

Integral Solutions Limited, *Catalyst Catalog*, p. 47 (1991).

Wang et al., *A Brain Tumor Diagnostic System with Automatic Learning Abilities*, Proceedings of Third Annual IEEE Symposium on Computer–Based Medical Systems, pp. 313–320 (Jun. 1990).

* cited by examiner

SYSTEM AND METHOD FOR PARTITIONING A REAL-VALUED ATTRIBUTE EXHIBITING WINDOWED DATA CHARACTERISTICS

RELATED APPLICATIONS

This application is a continuation-in-part of U.S. patent application Ser. No. 08/847,114, filed May 1, 1997, now U.S. Pat. No. 6,009,421, which is a continuation-in-part of U.S. patent application Ser. No. 08/196,707 filed Feb. 15, 1994 and issued as U.S. Pat. No. 5,694,524 on Dec. 2, 1997.

BACKGROUND OF THE INVENTION a) Technical Field

The present invention relates generally to a system and method for partitioning a real-value attribute having values associated with a first class and a second class into ranges, and more specifically to a system and method for partitioning an attribute into at least three ranges, wherein the values within a lower range and an upper range generally correspond to a first class of results and the values within a middle range generally correspond to a second class of results.

b) Background Art

Expert systems are used to mimic the tasks of an expert within a particular field of knowledge or domain, or to generate a set of rules applicable within the domain. In these applications, expert systems must operate on objects associated with the domain, which may be physical entities, processes or even abstract ideas. Objects are defined by a set of attributes or features, the values of which uniquely characterize the object. Object attributes may be discrete or continuous.

Typically, each object within a domain also belongs to or is associated with one of a number of mutually exclusive classes having particular importance within the context of the domain. Expert systems that classify objects from the values of the attributes for those objects must either develop or be provided with a set of classification rules that guide the system in the classification task. Some expert systems use classification rules that are directly ascertained from a domain expert. These systems require a "knowledge engineer" to interact directly with a domain expert in an attempt to extract rules used by the expert in the performance of his or her classification task.

Unfortunately, this technique usually requires a lengthy interview process that can span many man-hours of the expert's time. Furthermore, experts are not generally good at articulating classification rules, that is, expressing knowledge at the right level of abstraction and degree of precision, organizing knowledge and ensuring the consistency and completeness of the expressed knowledge. As a result, rules which are identified may be incomplete while important rules may be overlooked.

Still further, this technique assumes that an expert actually exists in the particular field of interest. Furthermore, even if an expert does exist, the expert is usually one of a few and is, therefore, in high demand. As a result, the expert's time and, consequently, the rule extraction process can be quite expensive.

It is known to use artificial intelligence within expert systems for the purpose of generating classification rules applicable to a domain. For example, an article by Bruce W. Porter et al., *Concept Learning and Heuristic Classification in Weak-Theory Domains*, 45 Artificial Intelligence 229–263 (1990), describes an exemplar-based expert system for use in medical diagnosis that removes the knowledge engineer from the rule extraction process and, in effect, interviews the expert directly to determine relevant classification rules.

In this system, training examples (data sets which include values for each of a plurality of attributes generally relevant to medical diagnosis) are presented to the system for classification within one of a predetermined number of classes. The system compares a training example with one or more exemplars stored for each of the classes and uses a set of classification rules developed by the system to determine the class to which the training example most likely belongs. A domain expert, such as a doctor, either verifies the classification choice or instructs the system that the chosen classification is incorrect. In the latter case, the expert identifies the correct classification choice and the relevant attributes, or values thereof, which distinguish the training example from the class initially chosen by the system. The system builds the classification rules from this information, or, if no rules can be identified, stores the misclassified training example as an exemplar of the correct class. This process is repeated for training examples until the system is capable of correctly classifying a predetermined percentage of new examples using the stored exemplars and the developed classification rules.

Other artificial intelligence methods that have been used in expert systems rely on machine induction in which a set of induction rules are developed or induced directly from a set of records, each of which includes values for a number of attributes of an object and an indication of the class of the object. An expert then reviews the induced rules to identify which rules are most useful or applicable to the classification task being performed. This method has the advantage of using the expert in a way that the expert is accustomed to working, that is, identifying whether particular rules are relevant or useful in the classification task. It should be noted, however, that all of the relevant attributes of the objects being classified must be identified and data for those attributes must be provided within the records in order for the system to induce accurate and complete classification rules.

A book chapter written by W. Buntine, D. Stirling, Interactive Induction, in *Machine Intelligence*, Vol. 12, pp. 121–137 (Hayes-Michie et al. eds., 1990), discloses that expert systems which use machine induction can be operated with greater accuracy if a domain expert interacts with the system by supplying additional subjective knowledge before classification rules are induced or by incrementally evaluating and validating the rules that are induced. Specifically, the domain expert can develop domain grammar which can be used to elicit relevant classification rules, suggest potential rules and identify whether particular induced rules are strong or weak in the domain context.

A classic example of a pure machine induction technique is described in an article by J. R. Quinlan, *Induction of Decision Trees*, 1 Machine Learning 81–106 (1986), the disclosure of which is hereby incorporated by reference herein. This technique searches through relations between combinations of attribute values and classes of objects to build an induction tree which is then used to generate precise classification rules. Referring to FIG. 1 herein, an exemplary Quinlan-type induction tree is constructed for a set of 100 records, each associated with an object having one of two classes C1 or C2 and attribute values $A\_1$ or $A\_2$, $B\_1$ or $B\_2$, and $C\_1$ or $C\_2$ for three attributes A, B and C, respectively.

During operation, the Quinlan method calculates a statistical measurement, referred to as an information gain value, for each of the attributes A, B and C and chooses the attribute with the highest information gain value at a root of the tree. The attribute values associated with chosen attribute are then identified as nodes of the tree and are examined. If all of the data records associated with a node are all of the same class, the node is labeled as a leaf or endpoint of the induction tree. Otherwise, the node is labeled as a branching point of the induction tree. The method then chooses a branching point, calculates the information gain value for each of the remaining attributes based on the data from the records associated with chosen branching point, chooses the attribute with the highest information gain value and identifies the attribute values of the chosen attribute as nodes which are examined for leaves and branching points. This process is repeated until only leaves remain within the induction tree or until, at any existing branching point, there are no attributes remaining upon which to branch.

Referring to FIG. 1, the attribute A is chosen at the root of the induction tree and the attribute values A_1 and A_2, which are nodes of the induction tree, are then examined. Attribute value A_1 is a leaf of the induction tree because all of the records associated therewith are associated with the class C1. The attribute value A_2 is a branching point BP1 and the attribute B branches therefrom. Likewise the attribute C branches from the attribute value B_1, which is labeled as branching point BP2. The attribute values B_2 and C_1 are leaves of the induction tree. The induction tree stops branching from a branching point BP3 because there are no remaining attributes upon which to branch at that node.

After an induction tree is constructed, classification rules are generated therefrom by tracing a path from a particular leaf of the induction tree to the root of the induction tree or vice versa. Thus, for example, the induction tree of FIG. 1 produces the following classification rules:

(1) C_1 and B_1 and A_2 results in C1;

(2) B_2 and A_2 results in C2;

(3) A_1 results in C1.

Although the Quinlan method is useful in identifying classification rules for a particular domain, the method is limited to attributes which have discrete values. However, techniques have been developed for discretizing numeric or real-valued attributes within a Quinlan-type induction tree. In fact, a simple method of discretizing a real-valued attribute is to choose generally known break points throughout the range of the attribute. For example, the real-valued attribute of age may be divided according to the generally accepted break points of child (0–10), adolescent (11–17), adult (18–45), middle-age (46–70), and elderly (70 and higher). Such a predetermined discretization method, however, is only possible if generally accepted break points exist within the domain. Furthermore, such a predetermined discretization method is only as accurate as the actual break points chosen and fails to account for concepts not identified by the predetermined break points. Thus, in the age example given above, any concept dealing with legal drinking age is unascertainable. For this reason, this method is a particularly poor technique of discretizing real-valued attributes in a domain about which a system designer has little a priori information.

Other simple discretization methods include dividing the continuous range of an attribute into intervals of equal size or dividing the continuous range of an attribute into intervals which include an approximately equal number of attribute values. However, with both of these methods, it is difficult or impossible for the system to learn unknown concepts because these methods ignore the distribution of the classes associated with the attribute values. Furthermore, it is very unlikely that the interval boundaries will be established in the places that best facilitate accurate classification using any of these methods.

A paper by Randy Kerber, ChiMerge: Discretization of Numeric Attributes, in *Proceedings of the Tenth National Conference on Artificial Intelligence*, 123–127 (1992), describes a method of discretizing real-valued attributes which takes into account the class associated with each attribute value. This method constructs an initial discretization having one attribute value per interval. The method then computes the chi-squared value for each pair of adjacent intervals and merges the pair of adjacent intervals with the lowest chi-squared value. The steps of computing the chi-squared values and merging continues in this manner until all pairs of intervals have chi-squared values which exceed a predetermined threshold.

Other discretization methods divide continuous-valued attributes into only two intervals separated at a cut point. One way to determine such a cut point is to evaluate every possible cut point, calculate the class entropy (i.e., the information gain value) of the attribute from the resulting partition and choose the cut point which results in the best class entropy measurement.

A problem associated with these discretization methods, however, is that they are computationally expensive, especially when a great number of attributes have been identified for a particular object or when a large number of records are used to induce classification rules. As a result, expert systems employing these discretization methods may be limited to discretizing the values of each real-valued attribute once during the tree building process.

U.S. Pat. No. 5,694,524 issued to Bob Evans, the disclosure of which is hereby expressly incorporated by reference herein discloses a method of dividing a real-valued attribute into three separate ranges. With reference to FIG. 2, the Evans method determines a first range (Range #1) wherein the data values generally correspond to a first class of results, class C1, and a second range (Range #2) wherein the data values generally correspond to a second class of results, class C2. In addition, the Evans method identifies a third range (Range #3) that lies between the first and second ranges where it is unknown whether the data values generally correspond with the first class C1 or the second class C2.

For some attributes, however, data values generally corresponding to a particular class of results lie in both a low range and a high range, while data values corresponding to a second class of results generally lie in a range between the low and high ranges of the first class. An example of an attribute exhibiting this characteristic, known as a "windowed attribute," is illustrated in FIG. 3, where C1 represents the data values associated with the first class of results and C2 represents the data values associated with the second class of results.

It is desirable to have a system and method that partitions a windowed attribute into discrete ranges, wherein each range includes values generally corresponding to a particular class of results. Furthermore, it is desirable to have a system and method that creates an induction tree, wherein at least one of the attributes is a windowed attribute and is partitioned into ranges such that each range generally corresponds to a particular class of results.

SUMMARY OF THE INVENTION

According to one aspect of the present invention, a system and method for dividing a real-valued attribute having values associated with a first class generally windowed by values associated with a second class into ranges includes the steps of separating the values of the real-valued attribute into first and second sets based on the class associated with each of the values, calculating a statistical property of the second set and defining a first subset as the values in the first set below (or above) the statistical property of the second set and a second subset to include values of the second set. The system and method then determine a range breakpoint between the first subset and the second subset by repeating the steps of (a) calculating a statistical property of the first subset and a statistical property of the second subset and (b) removing values from the first subset and the second subset based on the calculated statistical properties of the first and second subsets. The system and method determine the range breakpoint from one or more of the statistical properties of the first subset and the second subset calculated in step (a).

The system and method may also define a third subset to include values of the first set above the statistical property of the second set and a fourth subset to include values of the second set and then identify a second range breakpoint between the third subset and the fourth subset by repeating the steps of (c) calculating a statistical property of the third subset and a statistical property of the fourth subset and (d) removing values from the third subset and the fourth subset based on the calculated statistical properties of the third and fourth subsets. The system and method determine the second range breakpoint from one or more of the statistical properties of the third subset and the fourth subsets calculated in step (c).

If desired, the system and method may repeat steps (a) and (b) until the statistical property of the first subset is greater than or equal to the statistical property of the second subset and may repeat steps (c) and (d) until the statistical property of the fourth subset is less than or equal to the statistical property of the third subset.

Likewise, the system and method may determine the range breakpoints by setting the first breakpoint equal to the statistical property of the first or second subset (or some combination, such as an average, thereof) and by setting the second range breakpoint equal to the statistical property of the third or fourth subset (or some combination, such as an average, thereof).

According to another aspect of the present invention, a system and method divides a real-valued windowed attribute into ranges which are generally associated with a particular result or class. For example, the runs of a process during which the particular result occurred may be in a first class, and the runs of a process during which the particular result did not occur may be in a second class. The system and method create a first data set that contains all of the values for the attribute for the runs of the process corresponding to the first class and create a second data set that contains all of the values of the attribute for the runs of the process corresponding to the second class. A statistical property, such as a median or a mean, is then calculated for the second data set. Thereafter, a first subset is created to contain all of the values in the first data set that are less than the statistical property of the second data set, and a second subset is created to contain all of the values of the second data set. Statistical properties of the first and second subsets are then calculated and the value of a first temporary breakpoint is set equal to the value of the statistical property of the first subset, while the value of a second temporary breakpoint is set equal to the statistical property of the second subset.

Next, the data values within the first subset that are less than the first temporary breakpoint are eliminated or removed from the first subset, and the data values in the second subset that are higher than the second temporary breakpoint are eliminated or removed from the second subset. The statistical properties of the first subset and the second subset are recalculated and the first temporary breakpoint is set equal to the value of the statistical property of the first subset and the second temporary breakpoint is set equal to the value of the statistical property of the second subset if the statistical property of the first subset is less than the statistical property of the second subset. These steps are repeated (removing values from the first and second subsets, recalculating a statistical property for each subset, and setting the temporary breakpoints equal to the statistical properties of the first and second subsets) until the statistical property of the first subset is greater than the statistical property of the second subset. Once the statistical property of the first subset is greater than the statistical property of the second subset, the first breakpoint is set equal to the value of the first temporary breakpoint (of the previous iteration) and the second breakpoint is set equal to the value of the second temporary breakpoint (of the previous iteration).

Next, a third subset is created to contain the values within the second data set and a fourth subset is created to contain the values in the first data set that are greater than the statistical property of the second data set. Thereafter, statistical properties (such as means or medians) of the third and fourth subsets are calculated. A third temporary breakpoint is then set equal to the statistical property of the third subset and a fourth temporary breakpoint is set equal to the statistical property of the fourth subset.

The values in the third subset that are lower than the statistical property of the third subset and the values in the fourth subset that are higher than the statistical property of the fourth subset are then removed from these subsets. The statistical properties of the third and fourth subsets are then recalculated and the third and fourth temporary breakpoints are set equal to the statistical properties of the third and fourth subsets, respectively, if the statistical property of the third subset is not greater than the statistical property of the fourth subset. These steps (truncating the third and fourth subsets, calculating a statistical property for each subset, and setting a temporary breakpoint equal to the statistical properties) are repeated until the statistical property of the third subset is greater than the statistical property of the fourth subset. When the statistical property of the third subset is greater than the statistical property of the fourth subset, the third breakpoint is set equal to the third temporary breakpoint (of the previous iteration) and the fourth breakpoint is set equal to the fourth temporary breakpoint (of the previous iteration). The first, second, third and/or fourth breakpoints are then used to partition the attribute into a set of ranges.

In the invention, one or more of the statistical properties may comprise a mean or a median. Also, the values of the attribute lie between a minimum value and a maximum value and the set of ranges may include a first range having the values between the minimum value and the first breakpoint, a second range having values between the first breakpoint and the fourth breakpoint, and a third range having the values between the fourth breakpoint and the maximum value.

DETAILED DESCRIPTION OF THE PREFERRED EMBODIMENT

The present invention relates to a system and method for partitioning real-valued attributes exhibiting windowed data characteristics into ranges. One application in which the present invention is useful is in the creation of induction trees, wherein real-valued attributes are partitioned into ranges that serve as endpoints of the decision-making process or as nodes from which further decision-making branches occur. To better understand this application of the present invention, a system and method for making induction trees is first described, followed by a description of the real-valued partitioning routine of the present invention and how it may be used to partition attributes in an induction tree-making process.

Figure 4:
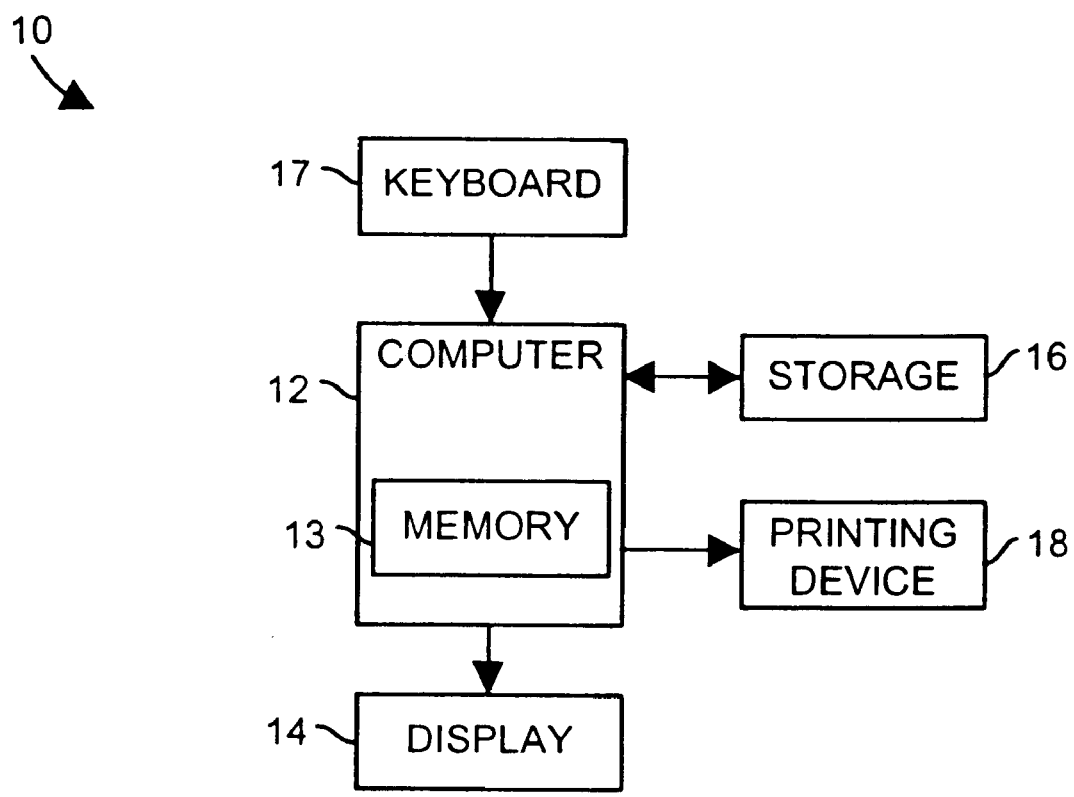
FIG. 4 is a block diagram of a computer system for use in partitioning real-valued data and in building an induction tree according to the present invention.

Referring to FIG. 4, a system 10 that constructs induction trees for the purpose of identifying conditions leading to a particular result in a multi-variant system includes a computer 12 having a memory 13 therein. The computer 12 is connected to a display 14 and to a data storage device 16 which stores a plurality of data used by the computer 12. A data entry device, such as a keyboard 17, allows a user to enter data and otherwise interact with the computer 12. If desired, the storage device 16 may comprise a disk drive, CD-ROM, etc. which alternatively or additionally allows a user to enter data into the computer 12. A printing device 18 is attached to the computer 12 and is capable of printing induction trees developed by the computer 12 and/or other information generated by the computer 12. Other known input/output devices might alternatively or additionally be used.

Figure 5A:
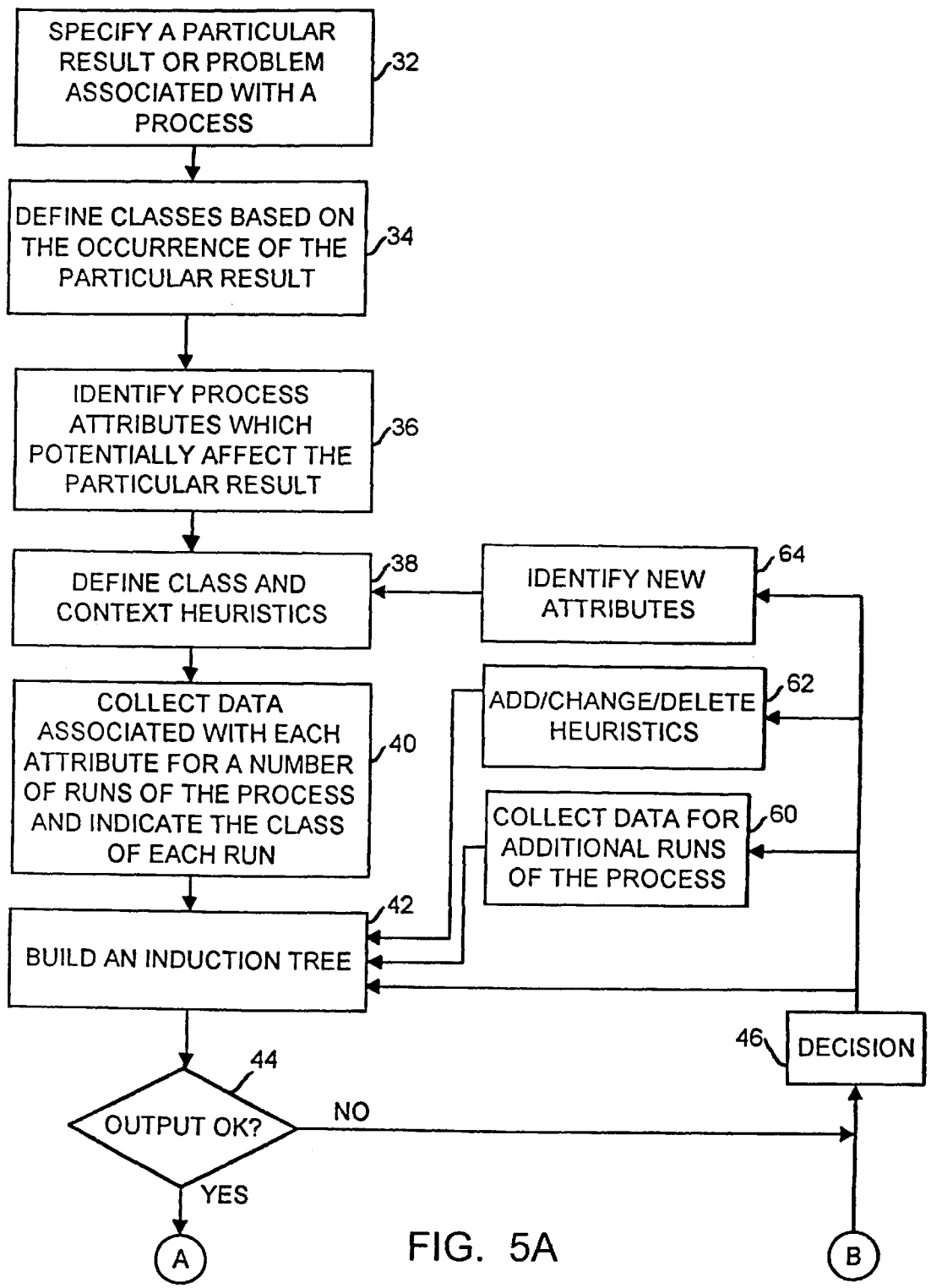
FIGS. 5A and 5B, when joined along similarly lettered lines, together comprise a flowchart of steps undertaken during a method of identifying conditions leading to a particular result in a multi-variant system using the real-valued method of data partitioning of the present invention.
Figure 5B:
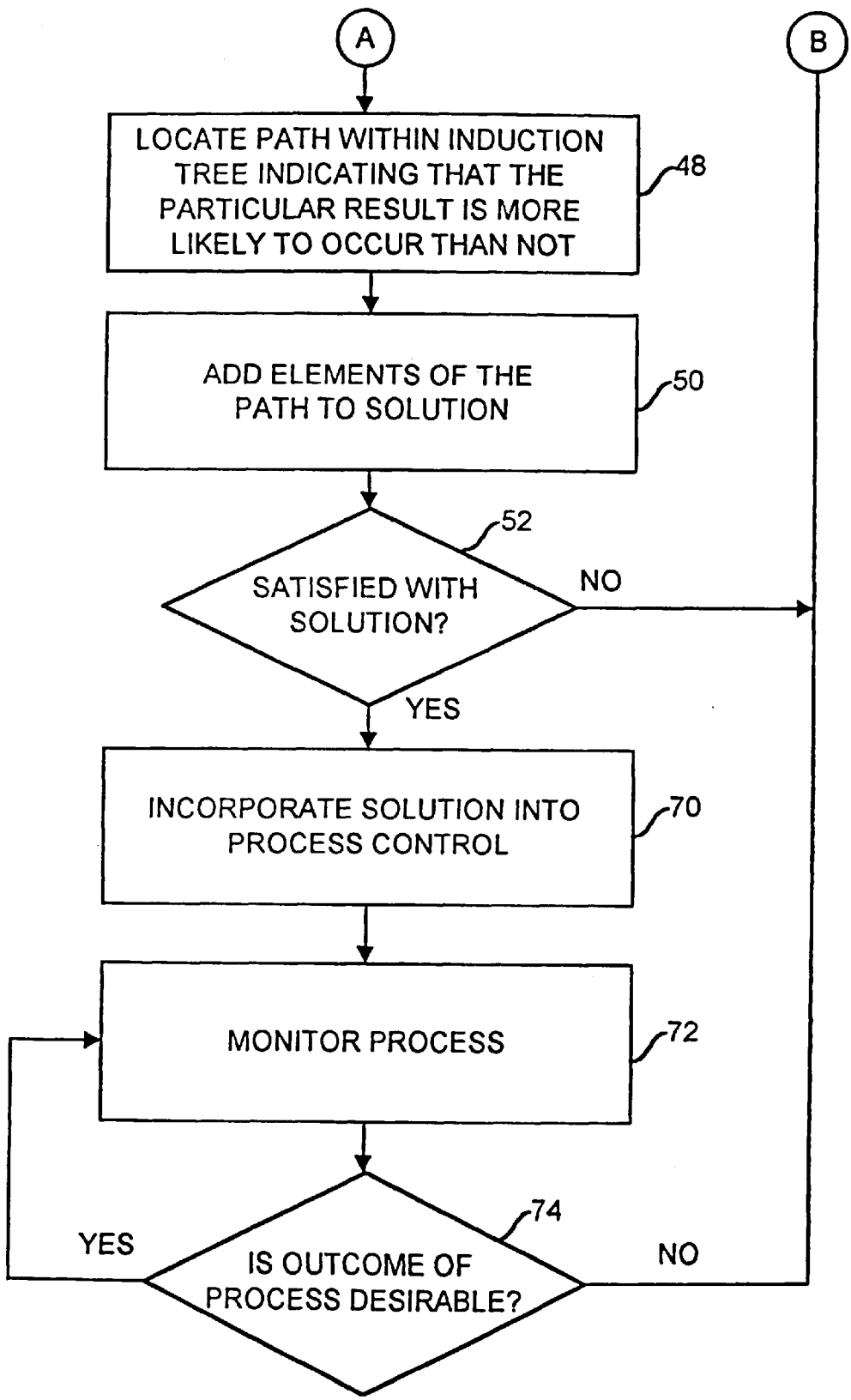

Referring now to FIGS. 5A and 5B, a flowchart illustrates a method which may be implemented in part by programming executed by the computer 12 which interactively identifies conditions leading to a particular result and which prescribes and implements a solution that increases or decreases the probability of occurrence of the particular result. Although the method is described as being used to identify conditions in a process, such as a printing process, it should be noted that the method can instead be applied to any system or domain having measurable attributes. Furthermore, the particular result described hereinafter comprises an undesirable outcome of a process and the method is used to decrease the occurrence of the particular result. It should be noted, however, that the particular result could instead comprise a desirable outcome or other desirable effect associated with the process and the method could be used to increase the probability that the particular result will occur.

At the start of the method, at a step 32, a domain expert who is knowledgeable about a process specifies a particular result associated with the process. At a step 34, the domain expert defines classes associated with the particular result. Typically, the nonoccurrence of the particular result is associated with a first class and the occurrence of the particular result is associated with a second class.

At a step 36, the domain expert identifies attributes or features of the process which are potentially relevant to the occurrence of the particular result of the process. These attributes can be continuous, e.g., real-valued, or discrete. If an attribute is discrete, the domain expert must identify the discrete values or categories that a value of the attribute can assume.

In order for the method to be ultimately successful in determining the cause of the particular result or in prescribing a solution which increases or decreases the probability of the occurrence of the particular result, it is important that all of the attributes that are actually relevant to the particular result be identified. If attributes that are actually relevant to the particular result are not identified at the step 36, the method may fail to determine the cause of the particular result or may produce an incomplete or inaccurate solution. However, identifying attributes which are not actually relevant to the occurrence of the particular result will not degrade the performance of the method or the solution ultimately obtained thereby.

At a step 38, the domain expert identifies class and context heuristics or rules associated with the attributes identified at the step 36. A class heuristic represents a known relationship between the distribution of classes and specific portions of the range of an attribute. A class heuristic preferably specifies that a particular range of an attribute should include a higher or lower proportion of attribute values which are associated with a particular one of the classes than any other range of the attribute. Class heuristics are used to prevent the method from searching for induction rules which are already known to be inaccurate in connection with the domain or the process.

A context heuristic represents an order of priority between two or more attributes. A context heuristic may, for example, specify that it is meaningless to search for induction rules associated with one of the identified attributes before searching for induction rules associated with a different one of the attributes. The attribute with the lower priority is said to be inactive within the context heuristics until the method has examined the attribute with the higher priority.

At a step 40, data or values are collected for each of the attributes for each of a number of runs of the process. A plurality of data records are then created, each of which includes values for the attributes identified at the step 36 along with the class associated with a particular run of the process. The plurality of records comprises a database which is used to develop induction rules associated with the process and which is stored within the storage device 16 of FIG. 4, preferably in text format. It is important that the values for the attributes are measured accurately. Inaccurate and/or incomplete data may lead to an inaccurate determination of the cause of the particular result or may lead to an inaccurate solution for increasing or decreasing the probability of the occurrence of the particular result.

Figure 1:
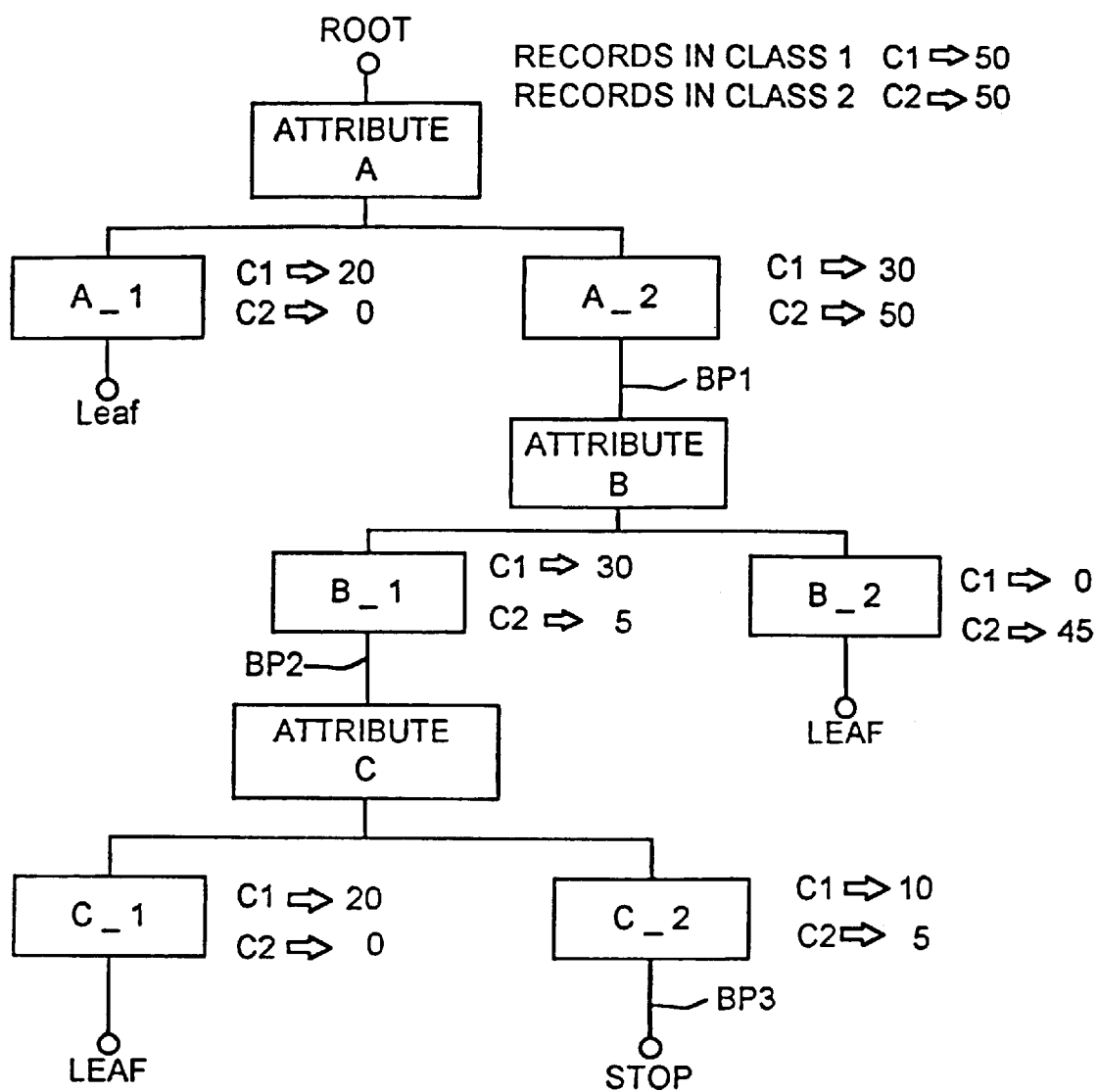
FIG. 1 comprises a diagram illustrating an induction tree constructed according to a prior art method.
Figure 2:
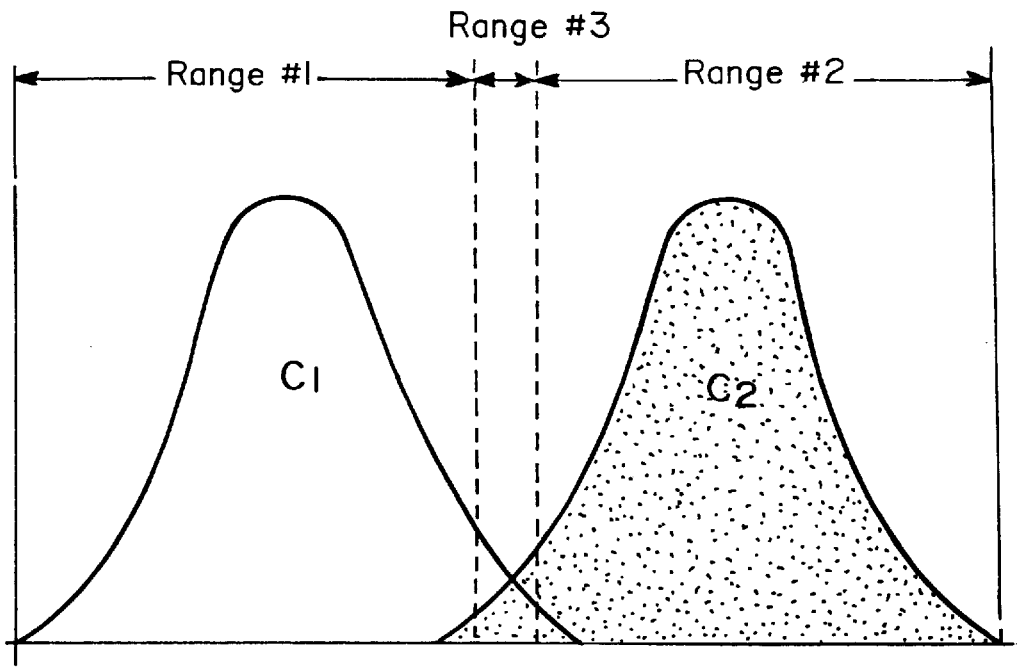
FIG. 2 is a graph illustrating the partitioning of an attribute using the Evans real-valued data partitioning method.
Figure 3:
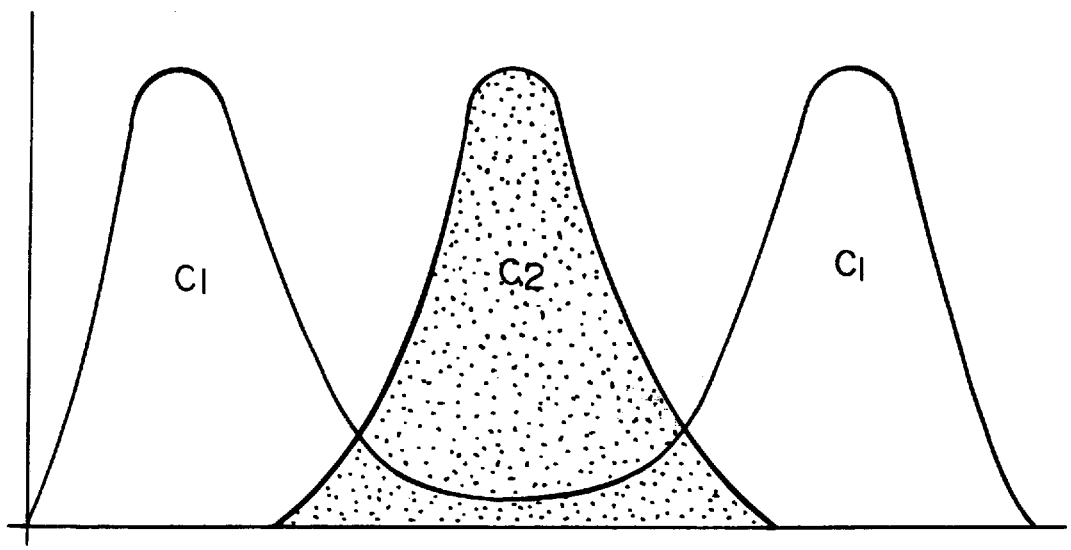
FIG. 3 is a graph illustrating the distribution of a windowed attribute.

At a step 42, the records created at the step 40 are used to construct an induction tree, the final form of which is similar to the induction tree illustrated in FIG. 1. Preferably, at the step 42, the domain expert is allowed to guide the construction of the induction tree interactively. Each induction tree created at the step 42 indicates relationships between values of the attributes and the classes identified for the process. An indication of the induction tree may be provided to a user via, for example, the printing device 18 of FIG. 4.

At a step 44, the domain expert reviews the induction tree to determine whether the induction tree is satisfactory, i.e., whether any potentially relevant induction rules may be suggested thereby. If the induction tree is not satisfactory because, for example, no induction rules can be identified or the induction rules which are identified are not implementable in the process due to economic, social, quality or other reasons, the method proceeds to a decision step 46.

However, if the induction tree is satisfactory, the method proceeds to a step 48 of FIG. 5B at which the domain expert locates one or more paths within the induction tree which indicate that the particular result is more likely to occur than not. Conversely or in addition, the domain expert may also locate one or more paths within the induction tree which indicate that the particular result less likely to occur than not. Each path identified by the expert may comprise one or more attribute values or ranges of attribute values associated with runs of the process that fall exclusively or almost exclusively into one of the classes defined at the step 34. Any particular induction tree may suggest any number of paths which lead to one or more components of a solution which, when used to control the process, will affect the probability of the occurrence of the particular result.

Rather than identifying induction rules manually by identifying such paths, the identification of induction rules can be performed automatically. A book written by J. R. Quinlan, C4.5: *Programs for Machine Learning* (1991), the disclosure of which is hereby incorporated by reference herein (in particular, chapters 5 and 9 and the appendix thereof), discloses a technique which automatically searches for and identifies induction rules within an induction tree. At a step 50, the components of the paths identified at the step 48 are added to a solution list, which may be stored in the memory 13 or the storage device 16 associated with the computer 12 of FIG. 4. Typically, different paths of either the same or different induction trees may identify different ranges of the same attribute as one of the solution components. If these ranges are not mutually exclusive, and where it is practical to do so, the domain expert preferably adopts the range included in all of the paths as the ultimate solution component.

At a step 52, the domain expert determines whether he or she is satisfied with the solution as compiled in the solution list. If the domain expert believes that the solution is not complete, the method proceeds to the decision step 46 of FIG. 5A.

At the step 46, the domain expert chooses one of a number of options in order to improve the quality of the induction tree constructed at the step 42 and to enhance the solution compiled at the step 50. Following the step 46, a new induction tree may be built at the step 42 with further input from the domain expert.

Furthermore, following the step 46, the method may proceed to a step 60 at which data is collected for additional runs of the process. The resulting additional records are added to the database used at the step 42 to build an induction tree. In this manner, a more complete or informative induction tree can be constructed at the step 42.

The method may instead proceed to a step 62 wherein the domain expert changes, adds and/or deletes one or more of the class and/or context heuristics previously identified for the domain. This is particularly useful when an induction tree indicates that the class heuristics previously identified are incorrect.

Furthermore, the method may instead proceed to a step 64 wherein the domain expert identifies additional attributes which may be relevant to the occurrence of the particular result but which were not previously identified. This is particularly useful when the induction tree developed at the step 42 does not present any clear results. At the step 64, the domain expert can also delete attributes from the set of attributes previously identified when, for example, the expert believes that those attributes are not, in fact, relevant to the particular result. If at least one new attribute is identified at the step 64, the method returns to the step 38 at which class and context heuristics for the new or already identified attributes are defined. At the step 40, data for a new plurality of runs of the process are collected to produce records having data for all of the attributes, including the newly identified attribute(s).

When, at the step 52 of FIG. 5B, the expert is satisfied with the solution obtained at the step 50, the solution is incorporated into the process by running the process at a step 70 so that the process attributes have values within the ranges specified by the solution. At a step 72, the process is monitored during subsequent runs thereof and a determination is made at a step 74 whether the solution has been adequate in achieving a desired outcome, for example, eliminating the particular result from the process in an acceptable manner.

If the outcome of the process is desirable, the method returns to the step 72 which continues to monitor the outcome of the process. If, however, the outcome of the process is not desirable or if the outcome of the process returns to an undesirable condition during further monitoring of the process, the method returns to the step 46 of FIG. 5A at which the expert builds a new induction tree, collects additional data for the identified attributes, changes heuristics or identifies new attributes, all in an effort to generate a more complete or accurate solution.

Generally, the induction tree constructed at the step 42 has a root and any number of nodes which branch from either the root or from another node of the induction tree. The induction tree is constructed iteratively and performs the same operations at the root and each node using only data contained in records which are in a "current" database which has a content that varies with position in the induction tree. At the root of the induction tree, the current database includes all of the records produced at the steps 40 and 60. The current database associated with any particular node of the induction tree includes a subset of the records of the database associated with the node (or root) from which the particular node branches.

Figure 6:
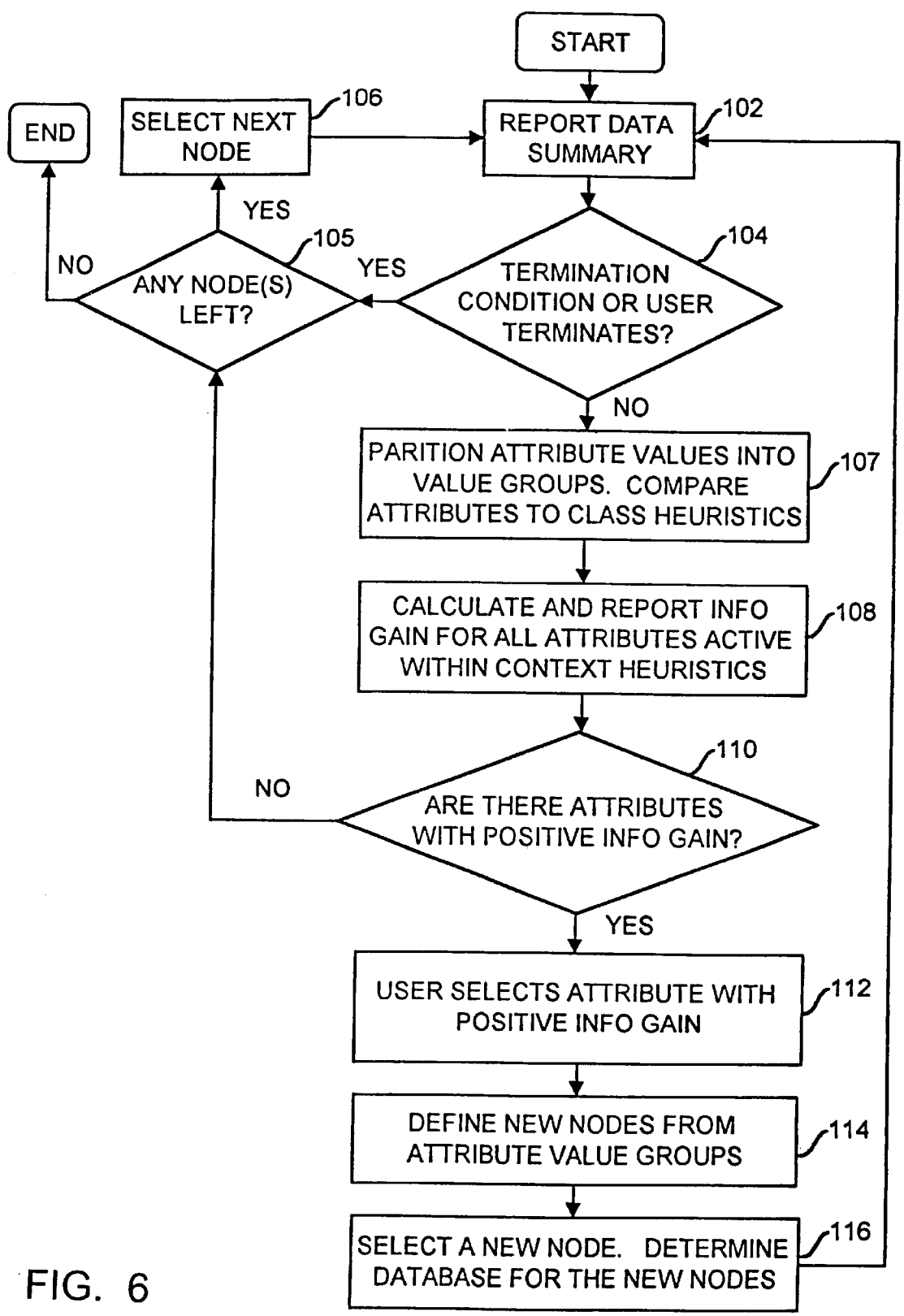
FIG. 6 comprises a flowchart of programming executed by the computer system of FIG. 4 for implementing a portion of the method of FIGS. 5A and 5B.

FIG. 6 illustrates a flowchart of programming, preferably in LISP (a commercially available programming language particularly suited for artificial intelligence applications), which is executed by the computer 12 to implement the step 42 of FIG. 5A. The programming begins at a block 102 which reports a summary of the records within the current database to the user via, for example, the display 14 of FIG. 4. Preferably, this summary indicates the number of records within the current database that are associated with each of the classes identified at the step 34 of FIG. 5A. The summary also identifies whether all of the records within the current database have the same value for any particular attribute and provides a characterization list which identifies the attributes for which that condition is satisfied. Still further, the summary may also list the values of one or more attributes and indicate the classes of the records having these values to provide the expert with more information about the records within the current database.

A block 104 then determines if a node termination condition is present. Preferably, a node termination condition exists if at least a predetermined percentage of the records within the current database are associated with the same class, in which case the node is labeled as an endpoint or a leaf of the induction tree. A node termination condition may also exist if all of the attributes active within the context heuristics have been selected as a branch within a path from the node to the root of the tree. Alternatively, a user can manually terminate the node using, for example, the keyboard 17 of FIG. 4 or another input device.

If a node termination condition exists, the block 104 terminates branching from the node and a block 105 determines if any unexamined nodes remain. If no unexamined nodes remain, the induction tree is complete and the program ends. If, however, all of the nodes have not been examined, a block 106 locates the next node, updates the current database to be that associated with the next node and returns control to the block 102. Alternatively, the block 106 can allow a user to select the next node to examine.

If the block 104 does not find a termination condition, a block 107 places each of the attributes in the characterization list into a context set identified for that node. The context set at each node is used to determine if an attribute is active within the context heuristics. The context set for a particular node (other than the root) includes: (1) the context set for the node from which the particular node branched (this node hereinafter referred to as the "previous node"); (2) any attribute identified in the characterization list by the block 102 for the particular node; and (3) the attribute chosen as the branch from the previous node to the particular node. The context set for the root of the induction tree contains only those attributes identified in the characterization list at the root of the induction tree.

The block 107 then partitions each active attribute into a finite number of value groups. Discrete attributes are partitioned into value groups according to discrete categories associated therewith. Real-valued or continuous attributes are partitioned into value groups based on the actual values of that attribute within the current database and the classes associated with those values, as described hereinafter with respect to FIGS. 7A–7D. The block 107 also determines whether the actual distribution of the classes among the value groups is consistent with the class heuristics defined for the attributes. If the block 107 discovers an inconsistency between the actual distribution of the classes among the value groups of an attribute and the distribution specified in the class heuristic, that attribute is marked with a disagreement flag.

Next, a block 108 calculates a figure of merit, such as the normalized information gain value for each of the attributes active within the context heuristics, using the value groups developed by the block 107. The information gain value of an attribute is a measure of the distribution of the classes across the value groups of the attribute. The information gain value is defined such that a value of "1" indicates a complete or "perfect" correlation between the attribute value groups and the classes. In such a case, each attribute value group contains instances of only one class or is an empty set and, hence, the value groups completely discriminate the classes. Information gain values between "0" and "1" indicate less than complete correlation between the value groups and the classes, i.e., there is some distribution of classes among the value groups of the attribute. Information gain values close to "1" indicate a high correlation between the attribute value groups and the classes and information gain values close to "0" indicate a low correlation between the attribute value groups and the classes. An information gain value of "0" indicates that no correlation between the attribute value groups and the classes exists and thus, that the classes are randomly distributed throughout the value groups of the attribute. In such a case, the distribution of the classes is not affected by the selection of the attribute and so, selection of the attribute at the node would not be particularly helpful.

Preferably, the information gain value IG(A) of an attribute A is calculated as follows:

$$IG(A)=I(p,n)-E(A) \tag{1}$$

wherein:

$$I(p, n) = -\frac{p}{p+n}\log_2\frac{p}{p+n} - \frac{n}{p+n}\log_2\frac{n}{p+n} \tag{2}$$

and $$E(A) = \text{Expected value of attribute } A \tag{3}$$
$$= \sum_{i=1}^{vg} \frac{p_i + n_i}{p+n} \cdot I(p_i, n_i)$$

where:
  p=Number of records within the current database associated with the first class; and
  n=Number of records within the current database associated with the second class;
and where:
  vg=Total number of value groups associated with attribute A;
  $p_i$=Number of records within the current database which are associated with the value group i of attribute A and which are associated with the first class;
  $n_i$=Number of records within the current database with are associated with the value group i of attribute A and which are associated with the second class; and
  $I(p_i,n_i)=I(p,n)$ calculated for $p=p_i$ and $n=n_i$.

Although the information gain value IG(A) is useful, it is biased toward those attributes which have a greater total number of value groups. Thus, an attribute having two value groups each with equal probability of having a particular class associated therewith will have an information gain value that is less than the information gain value of an attribute having six value groups each with an equal probability of having a particular class associated therewith. To correct this bias, the following normalizing information gain value NG(A) for attribute A is calculated by the block 108:

$$NG(A) = \frac{IG(A)}{NF(A)} \quad (4)$$

where:

$$NF(A) = -\sum_{i=1}^{vg} \left[ \frac{p_i}{p_i + n_i} \log_2 \frac{p_i}{p_i + n_i} + \frac{n_i}{p_i + n_i} \log_2 \frac{n_i}{p_i + n_i} \right] \quad (5)$$

Next, a block 110 determines if any of the attributes active within the context heuristics have positive normalized information gain values. If none of the attributes has a positive normalized information gain value, the block 110 terminates further branching from the node and control passes to the blocks 105 and 106 which select the next node to be examined. If, however, one or more of the attributes have a positive normalized information gain value, a block 112 presents each of the attributes active within the context heuristics and the normalized information gain value associated therewith to the expert via the display 14 of FIG. 4.

Preferably, the attributes are ranked according to the normalized information gain values associated therewith. Such ranking may include the categories of: BEST, for the attribute having the highest normalized information gain value; HIGHLY USEFUL, for attributes having a normalized information gain value at least 95 percent of the highest normalized information gain value; USEFUL, for attributes having a normalized information gain value between 90 and 95 percent of the highest normalized information gain value; MARGINAL, for attributes having a normalized information gain value between 75 and 90 percent of the highest normalized information gain value; QUESTIONABLE, for attributes having a normalized information gain value between 50 and 75 percent of the highest normalized information gain value; LAST RESORT, for attributes having a normalized information gain value above zero but below 50 percent of the highest normalized information gain value; and USELESS, for attributes having a normalized information gain value of substantially zero. Any other desired categories can be alternatively or additionally used.

Preferably, any attribute which has been marked by the block 107 as having a distribution of classes among its value groups that is inconsistent with a class heuristic is identified as such by, for example, placing brackets around the displayed normalized information gain value of that attribute. Alternatively, the normalized information gain value of any such attribute can be set to zero.

The block 112 then permits selection of one of the attributes as a branch within the induction tree. Preferably, the block 112 allows the domain expert to interactively select one of the attributes which, also preferably, has a positive normalized information gain value. It is important to note, however, that the expert need not select the attribute having the highest normalized information gain value, but can select any of the attributes active within the context heuristics according to any desired criteria. Alternatively, the block 112 can automatically select one of the attributes and, in such a case, preferably selects the attribute with the highest normalized information gain value. However, automatic selection of an attribute may lead to a less complete or desirable solution.

A block 114 causes branching on the chosen attribute such that new nodes are created within the induction tree, each of which is constituted by a value group of the chosen attribute. A block 116 permits a user to interactively terminate or select each of the new nodes for examination, defines a new current database for each selected node and places the selected attribute into the context set for that node. The new current database includes all of the records within the database of the previous node having values associated with the value group of the new node.

When one of the nodes has been selected, the block 116 stores an indication of the other nodes which were created by the block 114 and an indication of the databases and the context sets associated with those nodes for future examination in, for example, the data storage unit 16 of FIG. 4. The block 116 then returns to the block 102 which begins an iteration for the new node.

Referring now to FIGS. 7A–7D, the operation of the block 107 of FIG. 6 will be described in detail. A block 122 selects a present attribute and determines whether the present attribute is active within the context heuristics. In doing so, the block 122 compares the context set for the node with a context list associated with the present attribute. The context list associated with the present attribute identifies those attributes which must be branched upon in the induction tree before the present attribute can become active. If all of the attributes within the context list associated with the present attribute are also within the context set of the node being examined, the present attribute is deemed to be active. If the present attribute has an empty context list it is always active within the context heuristics.

A block 124 then determines if the present attribute is real-valued. If not, then the present attribute is a discrete valued attribute and a block 126 of FIG. 7B partitions the present attribute into value groups based on the categories associated with the present attribute which have been previously defined by the domain expert. If the block 124 determines that the present attribute is real-valued, a block 130 forms two data sets S1 and S2 from the values of the present attribute. The data set S1 includes all of the values of the present attribute in records within the current database associated with the first class C1. The data set S2 includes all of the values of the present attribute in records within the current database associated with the second class C2.

A block 132 then sorts all of the values within each of the data sets S1 and S2 in ascending order and a block 134 determines statistical properties, such as the medians M1 and M2 and the standard deviations SD1 and SD2 for the data sets S1 and S2, respectively. A block 136 checks whether the medians M1 and M2 are equal or whether the standard deviations SD1 and SD2 are equal. If either M1=M2 or SD1=SD2, then a windowing condition does not exist and the present attribute cannot be partitioned using the windowing method disclosed herein. In this case, other partitioning methods may be used including, for example, the partitioning method disclosed in U.S. Pat. No. 5,694, 524. Alternatively, no partitioning may be performed so that the present attribute will only have one value group and the normalized information gain value associated therewith will be zero. In any event, control is eventually passed to a block 180.

If, on the other hand, the medians M1 and M2 and the standard deviations SD1 and SD2 are not equal to one another, a block 140 determines whether the standard deviation SD2 is greater than the standard deviation SD1. If so, a block 142 relabels the data set S1 as data set S2, the median M1 as median M2, and the standard deviation SD1 as SD2, and also relabels the data set S2 as data set S1 and the median M2 as median M1 and the standard deviation SD2 as SD1. Furthermore, a block 144 stores a class flag to indicate that the data sets S1 and S2 have been relabeled. The switch is performed so that the bracketing data (the data set with the higher standard deviation) is always associated with S1, M1, and SD1 and the windowed data is always associated with S2, M2, and SD2.

Figure 8:
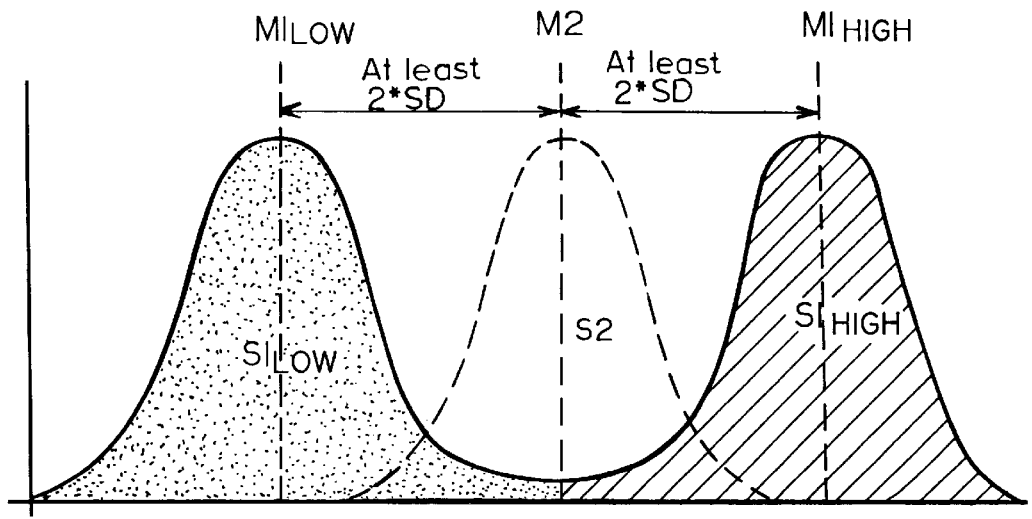
FIG. 8 is a graph illustrating a windowed attribute wherein the values corresponding to a first class of results have been separated into the data subsets $S1_{LOW}$ and $S1_{HIGH}$ and wherein the values corresponding to a second class of results have been separated into a data set $S2$.

Next, a block 146 (FIG. 7B) divides the bracketing data set S1 into two subsets $S1_{LOW}$ and $S1_{HIGH}$ based on the median M2 (or some other statistical property) of the windowed data set S2. A block 148 computes the medians of the two subsets, $M1_{LOW}$ for $S1_{LOW}$ and $M1_{HIGH}$ for $S1_{HIGH}$. A block 150 then checks to determine whether a windowing condition exists. If $M1_{LOW}$ is greater than M2 minus some user supplied delta, such as 2*SD (two standard deviations of the data set S2) or some other factor of the standard deviation of the data set S2, or if $M1_{HIGH}$ is less than M2 plus the user supplied delta then the window is too narrow and alternative partitioning routines must be employed. However, if $M1_{LOW}$ is less than M2 minus the user supplied delta and $M1_{HIGH}$ is greater than M2 plus the user supplied delta (indicated as 2*SD in FIG. 7B), then a windowed attribute condition exists and the method or apparatus of the present invention may be used to partition the attribute into real-valued ranges. (Of course, if desired, the delta used to determine windowing need not be supplied by a user but could, instead, be fixed and stored in memory.) The resulting sets and medians for a sample attribute exhibiting windowed characteristics is illustrated in FIG. 8. Of course, other criteria (including other multiples of the standard deviation) could be used to define a windowing condition.

Figure 9:
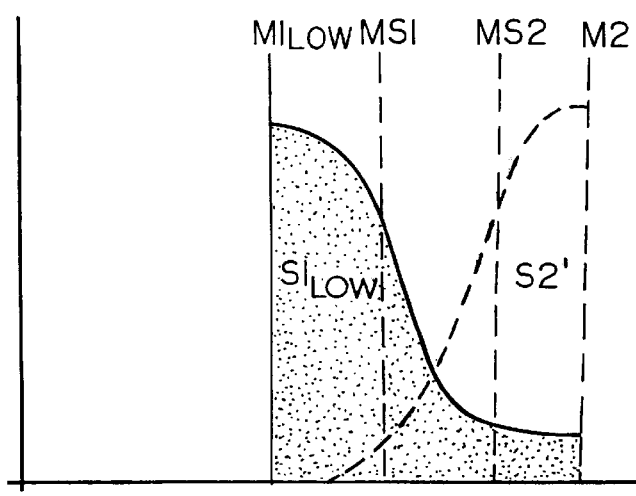
FIG. 9 is a graph illustrating the values of a windowed attribute that lie between the median of the subset $S1_{LOW}$ and the median of the data set $S2$.

When there is a valid set of windowed data, flow continues to a block 152 in FIG. 7C which is a flow chart of a routine that determines a breakpoint between the sets $S1_{LOW}$ and S2 such that the values below the breakpoint will generally correspond to the class associated with S1, and the values above the breakpoint will generally correspond to the class associated with S2. The block 152 defines a variable M2' equal to the median M2. Next, a block 154 redefines the subset $S1_{LOW}$ as all of the values in $S1_{LOW}$ that are greater than or equal to $M1_{LOW}$, and defines a subset S2' as all of the values in the set S2 that are less than or equal to M2. A block 156 determines the medians MS1 and MS2 for the truncated subsets $S1_{LOW}$ and S2', respectively. The resulting subsets $S1_{LOW}$ and S2', and the medians MS1 and MS2, are illustrated in FIG. 9.

By truncating the subsets $S1_{LOW}$ and S2, the median MS1 of $S1_{LOW}$ and the median MS2' of S2' are brought closer together in value than the original medians $M1_{LOW}$ and M2. A block 158 determines whether MS1 is greater than or equal to MS2. If not, a block 157 sets $M1_{LOW}$ and M2' equal to MS1 and MS2, respectively, and control returns to the block 154 where the sets $S1_{LOW}$ and S2' are further truncated to bring the medians closer together. The values of $M_{LOW}$ and M2 are temporary breakpoints. The blocks 154, 156, 157, and 158 are repeated until MS1 is greater than or equal to MS2, at which point suitable breakpoints have been found. A block 160 sets a first breakpoint X1 equal to $M1_{LOW}$ and a second breakpoint X2 equal to M2', which are the medians of the subsets $S1_{LOW}$ and S2' for the iteration before the medians crossed. Either breakpoint X1 or X2 (or some combination of these) may be used as the dividing point between the sets $S1_{LOW}$ and S2.

Figure 7A:
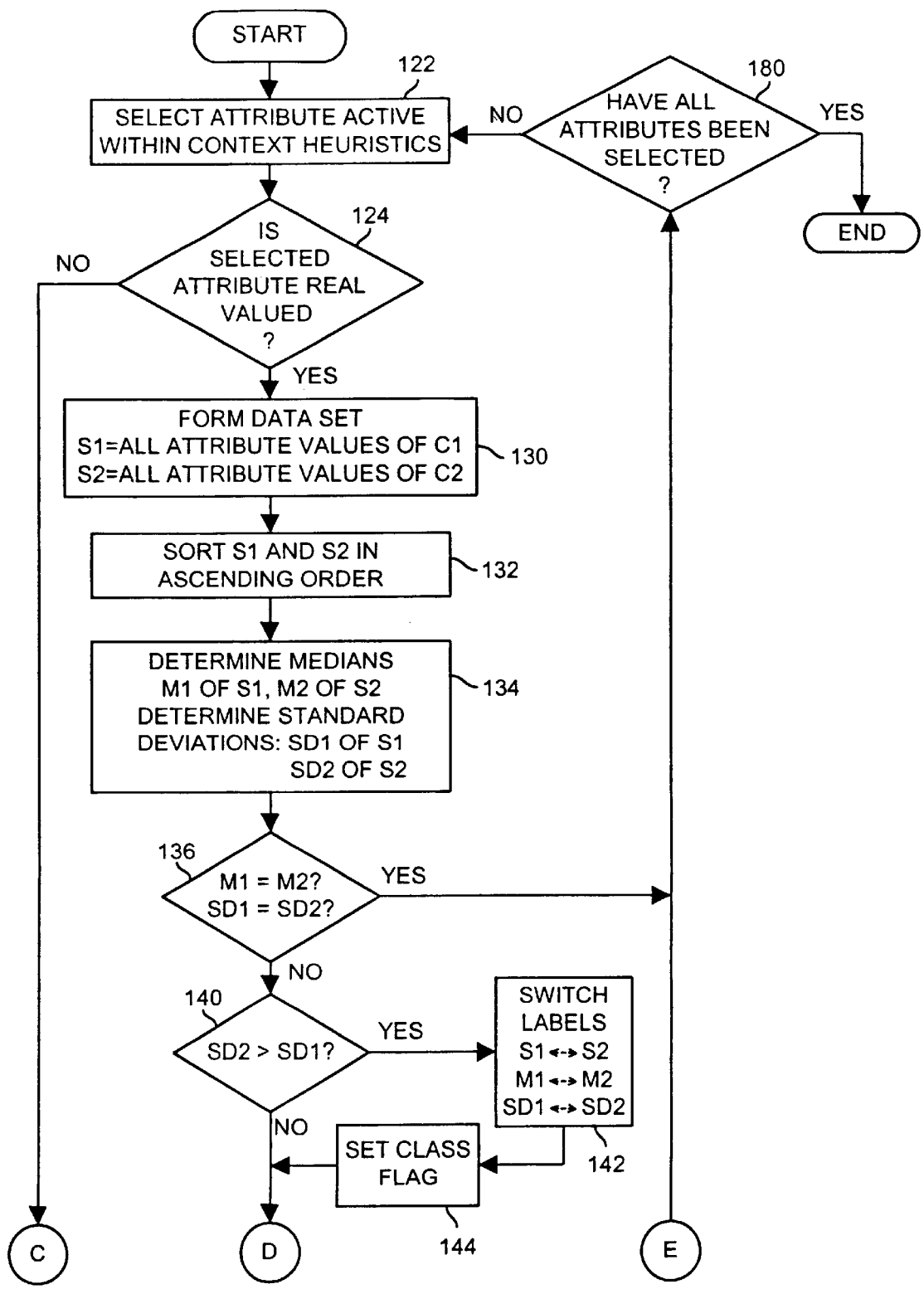
FIGS. 7A–7D, when joined along similarly lettered lines, together comprise a flowchart of programming for implementing block 107 of FIG. 6.
Figure 7B:
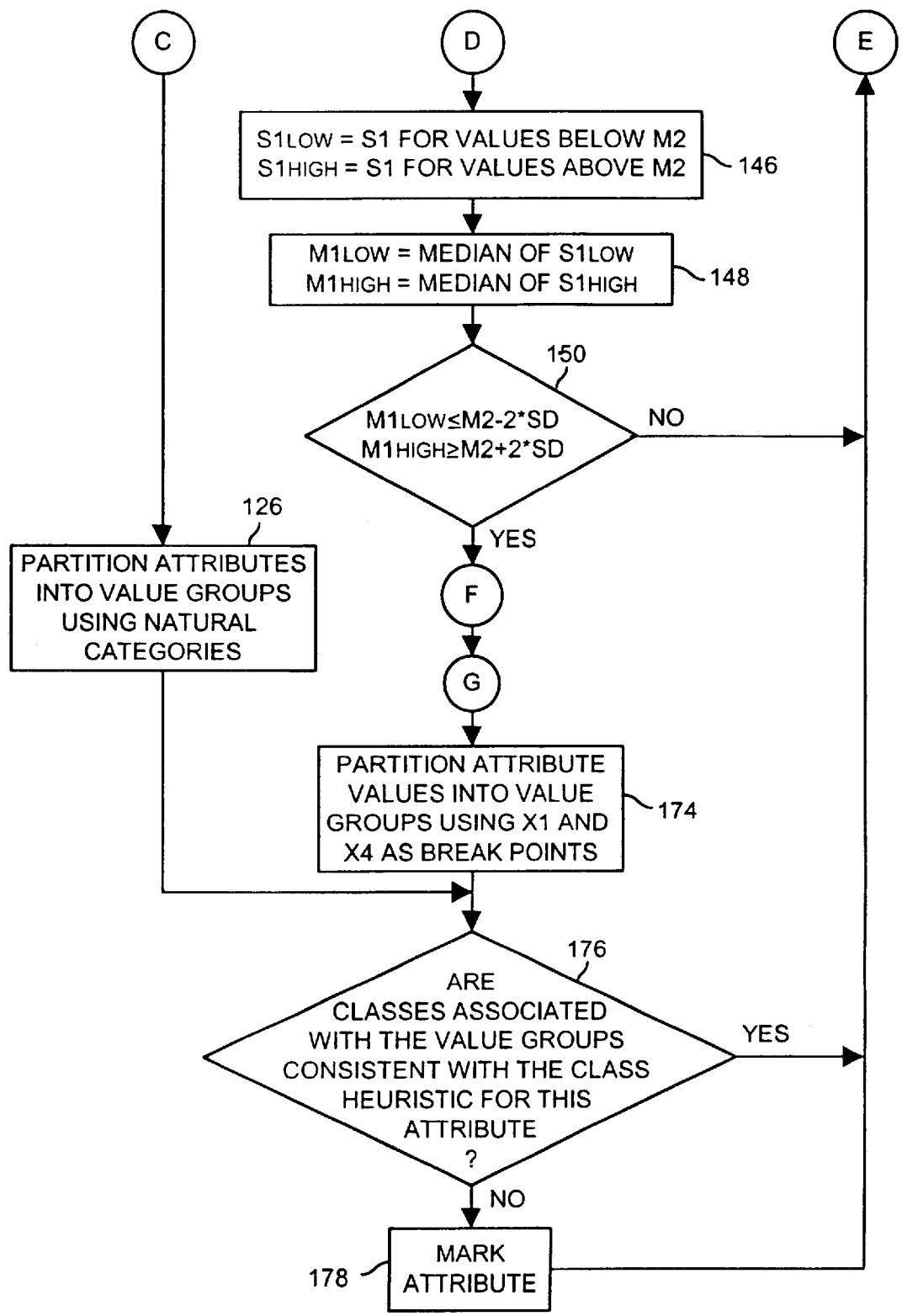
Figures 7C, 7D:
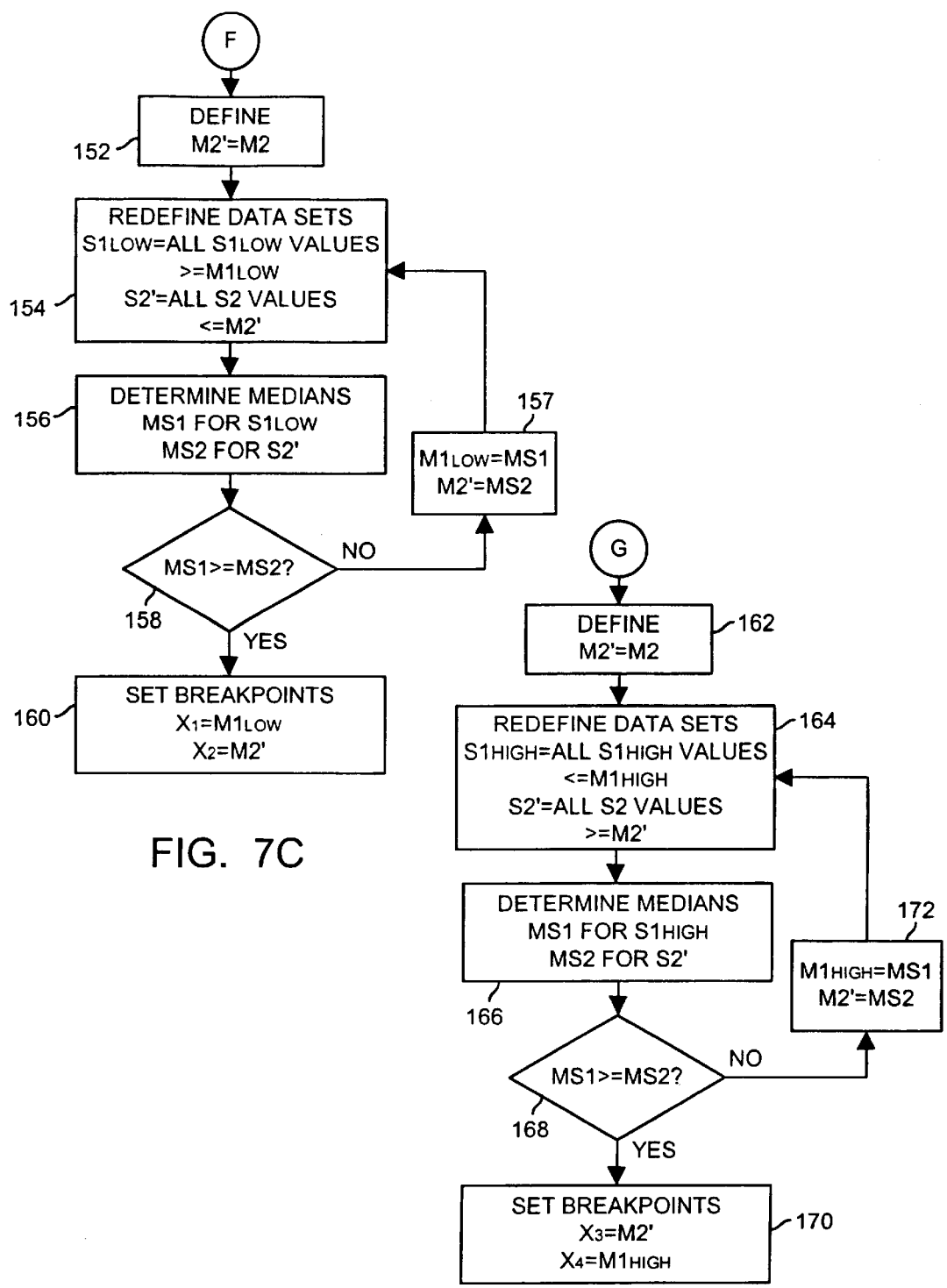

Next, referring to FIG. 7D, a dividing point must be found between the sets $S1_{HIGH}$ and S2. A block 162 sets M2' equal to the median M2 of the set S2. A block 164 redefines the subset $S1_{HIGH}$ as the data values in $S1_{HIGH}$ that are less than or equal to $M1_{HIGH}$, and defines the subset S2' as the values in S2 that are greater than or equal to M2'. A block 166 calculates the medians MS1 and MS2 for the subsets $S1_{HIGH}$ and S2', respectively. A block 168 checks whether MS1 is less than or equal to MS2. If so, the breakpoints have been found and control passes to a block 170. Otherwise, a block 172 sets $M1_{HIGH}$ equal to MS1 and M2' equal to MS2 and returns to the block 164. The blocks 164, 166, 168, and 172 are repeated until MS1 is less than or equal to MS2. At that point, the block 170 sets the breakpoints X3 and X4 equal to the medians M2' and $M1_{HIGH}$, which are the medians of the subsets S2' and $S1_{HIGH}$, respectively, for the iteration before the medians crossed.

After the breakpoints X1–X4 have been determined, a block 174 (FIG. 7B) divides the attribute into value groups using X1 and X4 as breakpoints. This procedure results in the following ranges:

$\min \leq Range_1 \leq X_1$ (Corresponds to $1^{st}$ Class of Results)

$X_1 < Range_2 < X_4$ (Corresponds to $2^{nd}$ Class of Results)

Figure 10:
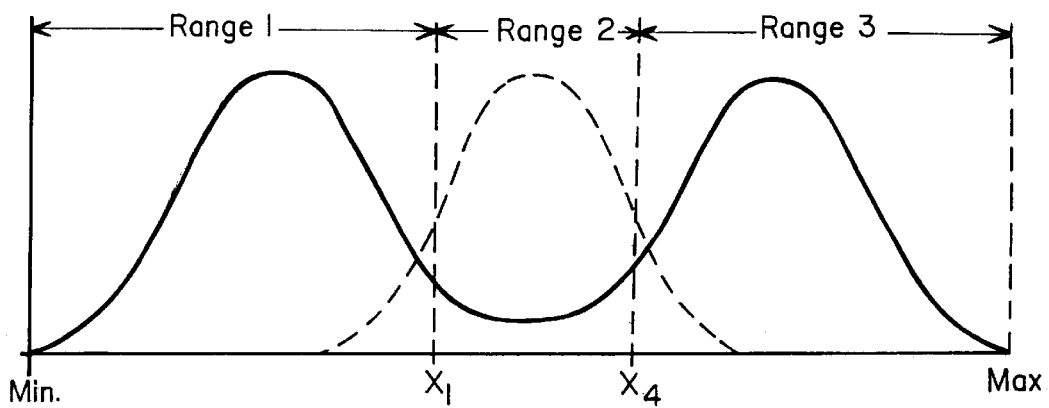
FIG. 10 is a graph illustrating a windowed attribute wherein the attribute has been divided into three ranges.

$X_4 \leq Range_3 \leq \max$ (Corresponds to $1^{st}$ Class of Results)

where min is the minimum value for the attribute and max is the maximum value for the attribute. These ranges are shown in FIG. 10 for a sample attribute. The ranges may alternatively be set using other combinations of the breakpoints X1–X4 (such as X2 and X3, the average of X1 and X2 and the average of X3 and X4, etc.) and the present invention is not limited to the use of X1 and X4.

Although the blocks 134, 148, 156, and 166 are described herein as determining the medians of the various data sets, other desired statistical properties of the data including, for example, the means, could instead be determined and used in the method illustrated in the flowchart of FIGS. 7A–7D. It should be noted that the above-described method of partitioning real-valued attributes is computationally simple and inexpensive and, therefore, can be applied at every node of the induction tree that is labeled as a branching point.

After the ranges for the real-valued attribute have been computed, a block 176 (FIG. 7B) determines whether the distribution of the classes among the value groups developed by the blocks 126 and 174 is consistent with any class heuristics previously identified at the steps 38 or 62 of FIG. 5A. For real-valued attributes, it is assumed that the first class is associated with the data set S1, meaning that proportionately more of the values within the data set S1 are associated with the first class than are associated with the second class. Likewise it is assumed that the second class is associated with the data set S2 such that proportionately more of the values within the data set S2 are associated with the second class than are associated with the first class. If, however, the class flag was set in the block 144 to indicate that the data sets S1 and S2 have been relabeled during the discretization process, it is assumed that the first class is associated with the data set S2 and that the second class is associated with the data set S1.

With respect to real-valued attributes, the block 176 determines if the class associated with the data set S1 or S2, as defined by the class flag, is consistent with the class heuristic. If the block 176 determines that the distribution of classes predominantly associated with the value groups of the attribute is inconsistent with the class heuristic identified for the attribute, a block 178 marks the attribute with a disagreement flag. After the attribute has been marked by the block 178 or, if the block 176 does not detect an inconsistency between the distribution of the classes of the values within the value groups of the attribute and a class heuristic defined for the attribute, the block 180 of FIG. 7A determines if all of the attributes that are active within the context heuristics have been selected. If so, the method proceeds to the block 108 of FIG. 6. Otherwise, the block 122 selects the next attribute for partitioning.

The present invention can be used to minimize the incidence of a phenomenon called "banding" in a rotogravure printing system. During production of a cylinder used in the printing system, an image is engraved onto a copper cylinder. A coating of chrome is thereafter applied to the copper cylinder and the coated cylinder is proofed. After any necessary changes are made, the cylinder is placed on a printing press. During the printing process, the engraved cylinder is rotated in a bath of ink, excess ink is removed from the cylinder by a blade and a roll of paper is pressed against the cylinder with a rubber roller to transfer ink from the image engraved on the cylinder to the roll of paper.

Rotogravure printing presses typically include eight printing units. Four of the units print an image on one side of the paper and, after the paper is turned, the remaining four units print an image on the opposite side of the paper. One of each set of the four units is dedicated to each of the primary colors (cyan, magenta, yellow) while the fourth is dedicated to black (key). By overlaying colors and black, virtually any color may be simulated.

When the paper exits the press, it is folded and cut to specified dimensions for inclusion in newspapers, magazines, books or other printed materials. After an order or job is completed, the engraved chrome image is removed from the copper cylinder and the copper cylinder is replated, allowing it to be engraved for another job.

Problems that cause delays can occur at any point within the rotogravure printing process, from the time that a copper cylinder is chrome plated to the time that the printed paper is folded and cut. One such delay results from cylinder "banding," which occurs as a result of grooves becoming engraved into the chrome plated cylinder surface during the printing process. These grooves collect ink and cause bands or streaks to be printed onto the roll of paper and ruin the final printed product.

Once a band appears in an image cylinder, the printing press must be shut down and a technician must remove the band by polishing it out of the cylinder. If the band has also created a groove in the copper sub-surface of the cylinder, the cylinder must be taken to a plating station where the chrome surface is removed, the band is polished out of the copper sub-surface and the cylinder is related. A cylinder band causes anywhere from one-half of an hour to six or more hours of delay in a particular printing press job. Delays caused by banding must generally be made up on weekends, requiring overtime pay for an eight to twelve person crew necessary for each printing job.

Although the prevention of cylinder banding has been pursued many times, the approaches usually included trial and error methods of adjusting printing control features. Typically, some of these approaches were successful in decreasing the incidence of banding initially, but banding usually reappeared later with very little indication as to the cause of the reappearance.

In applying the present invention to the problem of cylinder banding, it was necessary to define all possible attributes which could affect the probability of banding occurring and not occurring. One such attribute is the humidity of the pressroom, which is a continuous variable represented as a percentage from 0–100%.

Using a system embodying the present invention sample data was collected for 528 press runs to produce 528 records, each having a value for the humidity of the press room and an indication of the class of the run (i.e., Band or No_Band). Data collected during the printing process was typically recorded at a time that a press run was labeled with the class Band, i.e., when a band was detected, or sometime during or at the end of a press run which was ultimately labeled with the class No-Band.

The present invention detected the humidity attribute to be an attribute exhibiting windowed data characteristics. Data was collected and stored for the 528 runs with the following results:

| Humidity | 35–53% | 54–55% | 56–72% |
|---|---|---|---|
| Band | (127) 41.5% | (7) 14.0% | (82) 47.7% |
| No_Band | (179) 58.5% | (43) 86.0% | (90) 52.3% |
| Total | (306) 57.7% | (50) 9.4% | (172) 32.5% |

The number of records that satisfied both the range criteria and the banding result is shown in parenthesis (for example, 127 records fell in the 35–53% humidity range and resulted in banding), and the percentage listed is the percentage of runs for that particular range that resulted in Band or a No-Band result. The windowing algorithm embodied in the present invention divided the humidity attribute into three ranges. The ranges from 35–53% and 56–72% are ranges where banding is most likely to occur. Windowed between the two banding regions is the range 54–55% where banding is not likely to occur. By using the present windowed attribute partitioning routine, the desired No_Band region was detected. Other methods of dividing attributes that are unable to detect and partition windowed attributes would have been unable to detect the narrow No_Band region bracketed by the two Band regions.

Although the method and system have been described as being used for the problem of banding within a printing process, it should be noted that the same method and/or system can be used to solve other problems within the printing process, such as web breaks. Moreover, the method and system described and claimed herein can be generally applied to any production process or assembly line operation or other process with multiple outputs, some of which can be defective when measured against a table of requirements. Thus, for example, the method can be applied to, but is not limited to, automotive assembly, paper making, drug manufacturing, microprocessor production, and an ink/paint/adhesive manufacturing process. Of course, the system and method hereof can be used in any other application and is not limited to use in induction tree building algorithms or, for that matter, to artificial intelligence or data mining applications.

Numerous modifications and alternative embodiments of the invention will be apparent to those skilled in the art in view of the foregoing description. Accordingly, this description is to be construed as illustrative only and is for the purpose of teaching those skilled in the art the manner carrying out the invention. The details of the structure may be varied substantially without departing from the spirit of the invention, and the exclusive use of all modifications, which are within the scope of the appended claims, is reserved.

It is claimed:

1. A method of dividing a real-valued process attribute representative of a characteristic of a production process and having values associated with a first class representative of a first result of the production process generally windowed by values associated with a second class representative of a second result of the production process into ranges, the method comprising:

a step for separating the values of the real-valued process attribute into a first set if the values are associated with the first class and into a second set if the values are associated with the second class;

a step for calculating a statistical property of the second set;

a step for defining a first subset as the values in the first set to one side of the statistical property of the second set and a second subset to include values of the second set; and a step for repeating:
   (a) a step for calculating a statistical property of the first subset and a statistical property of the second subset; and
   (b) a step for removing values from the first subset and the second subset based on the calculated statistical properties of the first and second subsets; and a step for determining a first range breakpoint between the first and second subsets from one or more of the statistical properties of the first subset and the second subset calculated in step (a), wherein the first range breakpoint generally represents a division between values of the real-valued process attribute corresponding to the first result of the production process and values of the real-valued process attribute corresponding to the second result of the production process.

2. The method of claim 1, wherein the step for defining defines the first subset to include the values in the first set below the statistical property of the second set and wherein the steps (a) and (b) are repeated until the statistical property of the first subset is greater than or equal to the statistical property of the second subset.

3. The method of claim 1, wherein the step for defining defines the first subset to include the values in the first set above the statistical property of the second set and wherein steps (a) and (b) are repeated until the statistical property of the first subset is less than or equal to the statistical property of the second subset.

4. The method of claim 1, wherein the step for defining defines the first subset to include the values in the first set below the statistical property of the second set the method further including:

a step for defining a third subset as the values in the first set above the statistical property of the second set and a fourth subset to include values of the second set;

a step for repeating:
   (c) a step for calculating a statistical property of the third subset and a statistical property of the fourth subset; and
   (d) a step for removing values from the third subset and the fourth subset based on the calculated statistical properties of the third and fourth subsets; and a step for determining a second range breakpoint from one or more of the statistical properties of the third subset and the fourth subset calculated in step (c), wherein the second range breakpoint generally represents a division between values of the real-valued process attribute corresponding to the first result of the production process and values of the real-valued process attribute corresponding to the second result of the production process.

5. The method of claim 4, wherein the step for determining the first range breakpoint includes a step for setting the first range breakpoint equal to the statistical property of the first subset and the step for determining the second range breakpoint includes a step for setting the second range breakpoint equal to the statistical property of the fourth subset.

6. The method of claim 4, wherein the step for determining the first range breakpoint includes a step for setting the first range breakpoint equal to the statistical property of the second subset and the step for determining the second range breakpoint includes a step for setting the second range breakpoint equal to the statistical property of the third subset.

7. The method of claim 1, wherein the step for determining the first range breakpoint includes a step for calculating the first range breakpoint as a combination of the statistical properties of the first and second subsets.

8. A system for use in developing an indication of a cause of a particular result of a production process from values associated with attributes arising during runs of the production process, wherein the runs during which the particular result occurred are in a first class and the runs during which the particular result did not occur are in a second class, and at least one of the attributes is a real-valued attribute having values associated with one of the classes generally windowed by values associated with the other one of the classes, comprising:

a data entry device for permitting a user to enter data indicating the attribute values and the class associated with each of the attribute values;

a memory for storing the data indicating the attribute values and the class associated with each of the attribute values;

a processing unit including a second memory that stores a computer-implementable routine that performs:
   a step for separating the values of the real-valued attribute into first and second sets based on the class associated with each of the values;
   a step for calculating a statistical property of the second set;
   a step for defining a first subset as the values in the first set to one side of the statistical property of the second set and a second subset to include values of the second set;
   a step for repeating:
      (a) a step for calculating a statistical property of the first subset and a statistical property of the second subset; and
      (b) a step for removing values from the first subset and the second subset based on the calculated statistical properties of the first and second subsets; and
   a step for determining a first range breakpoint from one or more of the statistical properties of the first and second subsets calculated in step (a), wherein the first range breakpoint generally represents a division between values corresponding to runs of the production process during which a particular result occurred and values corresponding to runs of the production process during which the particular result did not occur.

9. The system of claim 8, wherein the computer-implementable routine performs the step for defining the first subset to include the values in the first set below the statistical property of the second set, wherein the computer-implementable routine further performs:

a step for defining a third subset to include the values in the first set above the statistical property of the second set and a fourth subset to include the values of the second set;

a step for repeating:
   (c) a step for calculating a statistical property of the third subset and a statistical property of the fourth subset; and (d) a step for removing values from the third subset and the fourth subset based on the calculated statistical properties of the third and fourth subsets; and a step for determining a second range breakpoint from one or more of the statistical properties of the third subset and the fourth subsets calculated in step (c), wherein the second range breakpoint generally represents a division between values corresponding to runs of the production process during which a particular result occurred and values corresponding to runs of the production process during which the particular result did not occur.

10. The system of claim 9, wherein the computer-implementable routine performs the step for determining the first range breakpoint by setting the first range breakpoint equal to the statistical property of the first subset and the performs the step for determining the second range breakpoint by setting the second range breakpoint equal to the statistical property of the fourth subset.

11. The system of claim 8, wherein the computer-implementable routine performs a step for determining if the first real-valued attribute has values that are windowed.

12. The system of claim 11, wherein the step for determining if the real-valued attribute has values that are windowed includes:

a step for creating a fifth subset to include the values of the first set below the statistical property of the second set;

a step for creating a sixth subset to include the values of the first set above the statistical property of the second set;

a step for determining a statistical property of the fifth subset and of the sixth subset; and a step for identifying that the values of the real-valued attribute are windowed if the statistical property of the fifth subset is less than the statistical property of the second set by a first amount and the statistical property of the sixth subset is greater than the statistical property of the second set by a second amount.

13. A method of dividing values of a real-valued process attribute for a number of runs of a production process into ranges having classes generally associated therewith, the method comprising:

a) a step for creating a first data set that contains the values of the real-valued process attribute for the runs of the production process corresponding to a first class representing runs during which a particular result occurred;

b) a step for creating a second data set that contains the values of the real-valued process attribute for the runs of the production process corresponding to a second class representing runs during which the particular result did not occur;

c) a step for calculating a first statistical property that is a statistical property of the second data set;

d) a step for creating a first subset that contains the values in the first data set that are less than the first statistical property;

e) a step for creating a second subset that contains the values of the second data set;

f) a step for calculating a second statistical property that is a statistical property of the first subset and a third statistical property that is a statistical property of the second subset;

g) a step for saving the second and third statistical properties;

h) a step for eliminating the data values in the first subset that are lower than the second statistical property and eliminating the data values in the second subset that are higher than the third statistical property;

i) a step for recalculating the second statistical property as a statistical property of the first subset and the third statistical property as a statistical property of the second subset;

j) a step for determining a first breakpoint from one or more of the second and third statistical properties saved in step (g) if the second statistical property of step (i) is greater than or equal to the third statistical property of step (i), wherein the first breakpoint generally represents a division between values corresponding to runs of the production process during which the particular result occurred and values corresponding to runs of the production process during which the particular result did not occur;

k) a step for repeating steps g) through j) until the second statistical property is greater than or equal to the third statistical property;

l) a step for creating a third subset that contains the values of the second data set and a fourth subset that contains the values of the first data set that are greater than the first statistical property;

m) a step for calculating a fourth statistical property that is a statistical property of the third subset and a fifth statistical property that is a statistical property of the fourth subset;

n) a step for saving the fourth and fifth statistical properties;

o) a step for eliminating the values in the third subset that are lower than the fourth statistical property and eliminating the values in the fourth subset that are higher than the fifth statistical property p) a step for recalculating the fourth statistical property as a statistical property of the third subset and the fifth statistical property as a statistical property of the fourth subset;

q) a step for setting a second breakpoint based on one or more of the fourth or fifth statistical properties saved in step (n) if the fourth statistical property of step (p) is greater than or equal to the fifth statistical property of step (p), wherein the second breakpoint generally represents a division between values corresponding to runs of the production process during which the particular result occurred and values corresponding to runs of the production process during which the particular result did not occur;

r) a step for repeating steps n) through q) until the fourth statistical property is greater than or equal to the fifth statistical property; and s) a step for using the first and second breakpoints to divide the values of the attribute into a set of ranges.

14. The method of claim 13, wherein the second statistical property, the third statistical property, the fourth statistical property, and the fifth statistical property, is each a median.

15. The method of claim 13, wherein the second statistical property, the third statistical property, the fourth statistical property, and the fifth statistical property, is each a mean.

16. The method of claim 13, wherein the values for the real-valued attribute are between a minimum value and a maximum value and wherein the set of ranges comprises:

a first range including the values for the real-valued attribute from the minimum value through the first breakpoint;

a second range including the values for the real-valued attribute from the first breakpoint through the second breakpoint; and a third range including the values for the real-valued attribute from the second breakpoint to the maximum value.

17. The method of claim 13, further including a step or using the set of ranges to create an induction tree that uses the real-valued attribute.

18. A system for use in developing an indication of a cause of a particular result of a production process from values associated with attributes arising during runs of the production process, wherein the runs during which the particular result occurred are in a first class and the runs during which the particular result did not occur are in a second class, and at least one of the attributes is a real-valued attribute having values associated with one of the classes generally windowed by values associated with the other one of the classes, the system comprising:

a data entry device for permitting a user to enter data indicating the attribute values and the class associated with each of the attribute values;

a memory for storing the data indicating the attribute values and the class associated with each of the attribute values;

a) a means for creating a first data set that contains the values of the real-valued attribute for the runs of the process corresponding to the first class;

b) a means for creating a second data set that contains the values of the real-valued attribute for the runs of the process corresponding to the second class;

c) a means for calculating a first statistical property that is a statistical property of the second data set;

d) a means for creating a first subset that contains the values in the first data set that are less than the first statistical property;

e) a means for creating a second subset that contains the values of the second data set;

f) a means for calculating a second statistical property that is a statistical property of the first subset and a third statistical property that is a statistical property of the second subset;

g) a means for saving the second and third statistical properties;

h) a means for eliminating the data values in the first subset that are lower than the second statistical property and eliminating the data values in the second subset that are higher than the third statistical property;

i) a means for recalculating the second statistical property as a statistical property of the first subset and the third statistical property as a statistical property of the second subset;

j) a means for determining a first breakpoint from one or more of the second and third statistical properties saved in step (g) if the second statistical property of step (i) is greater than or equal to the third statistical property of step (i);

k) a means for executing the means (g) through (j) until the second statistical property is greater than or equal to the third statistical property;

l) a means for creating a third subset that contains the values of the second data set and a fourth subset that contains the values of the first data set that are greater than the first statistical property, m) a means for calculating a fourth statistical property that is a statistical property of the third subset and a fifth statistical property that is a statistical property of the fourth subset;

n) a means for saving the fourth and fifth statistical properties;

o) a means for eliminating the values in the third subset that are lower than the fourth statistical property and eliminating the values in the fourth subset that are higher than the fifth statistical property;

p) a means for recalculating the fourth statistical property as a statistical property of the third subset and the fifth statistical property as a statistical property of the fourth subset;

q) a means for setting a second breakpoint based on one or more of the fourth or fifth statistical properties saved by the means (n) if the fourth statistical property of the means (p) is greater than or equal to the fifth statistical property of the means (p);

r) a means for repeating the means (n) through (q) until the fourth statistical property is greater than or equal to the fifth statistical property; and s) a means for using the first and second breakpoints to divide the values of the attribute into a set of ranges, wherein the first and second breakpoints generally represent divisions between values corresponding to runs of the production process during which the particular result occurred and values corresponding to runs of the production process during which the particular result did not occur.

19. The system of claim 18, wherein the second statistical property, the third statistical property, the fourth statistical property, and the fifth statistical property, is each a median.

20. The system of claim 18, wherein the second statistical property, the third statistical property, the fourth statistical property, and the fifth statistical property, is each a mean.

21. The system of claim 18, further including a means for using the set of ranges to create an induction tree that uses the real-valued attribute.

22. The system of claim 18, further including a means for determining if an attribute has values that are windowed.

23. The system of claim 22, wherein the means for of determining if the attribute has values that are window includes:

a means for creating a fifth subset to include the values of the first set below the statistical property of the second set;

a means for creating a sixth subset to include the values of the first set above the statistical property of the second set;

a means for determining a statistical property of the fifth subset and of the sixth subset; and a means for identifying that the values of the attribute are windowed if the statistical property of the fifth subset is less than the statistical property of the second set by a first amount and the statistical property of the sixth subset is greater than the statistical property of the second set by a second amount.

* * * * *